US 10,587,138 B2

(12) United States Patent
Goto et al.

(10) Patent No.: US 10,587,138 B2
(45) Date of Patent: Mar. 10, 2020

(54) ELECTRIC APPARATUS

(71) Applicant: MAKITA CORPORATION, Anjo-shi, Aichi-ken (JP)

(72) Inventors: Masahiko Goto, Anjo (JP); Takayoshi Endo, Anjo (JP); Tomonobu Nashimoto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 640 days.

(21) Appl. No.: 15/378,641

(22) Filed: Dec. 14, 2016

(65) Prior Publication Data

US 2017/0098949 A1     Apr. 6, 2017

Related U.S. Application Data

(63) Continuation of application No. 13/823,416, filed as application No. PCT/JP2011/069118 on Aug. 25, 2011, now Pat. No. 9,559,539.

(30) Foreign Application Priority Data

Oct. 8, 2010   (JP) ................................ 2010-228217

(51) Int. Cl.
 *H02J 7/00* (2006.01)
 *A47J 31/00* (2006.01)
(52) U.S. Cl.
 CPC .......... *H02J 7/0063* (2013.01); *A47J 31/005* (2013.01); *Y10T 307/461* (2015.04)

(58) Field of Classification Search
 CPC .... H02J 7/0063; A47J 31/005; Y10T 307/461
 See application file for complete search history.

(56) References Cited

U.S. PATENT DOCUMENTS

| 3,290,484 | A | | 12/1966 | Day |
| 3,998,143 | A | | 12/1976 | Frye |
| 4,974,500 | A | * | 12/1990 | Boyd ..................... A47B 31/02 221/96 |
| 5,725,304 | A | | 3/1998 | Inai |
| 5,923,257 | A | | 7/1999 | Nolte |
| 6,049,144 | A | | 4/2000 | Frannhagen et al. |

(Continued)

FOREIGN PATENT DOCUMENTS

| CN | 1353588 A | 6/2002 |
| CN | 2843285 Y | 12/2006 |

(Continued)

OTHER PUBLICATIONS

Feb. 27, 2015 Office Action issued in Chinese Patent Application No. 201180048565.1.

(Continued)

*Primary Examiner* — Rexford N Barnie
*Assistant Examiner* — Thai H Tran
(74) *Attorney, Agent, or Firm* — Oliff PLC

(57) ABSTRACT

A rechargeable battery type electric power tool is widely used for a construction work or a horticultural work. A battery of the electric power tool can also be used as a power source of an electric apparatus. Because of this construction, there is provided the electric apparatus that has a function equivalent to that of an AC power source type apparatus.

10 Claims, 21 Drawing Sheets

(56) References Cited

U.S. PATENT DOCUMENTS

| | | | |
|---|---|---|---|
| 6,123,010 A | 9/2000 | Blackstone | |
| 2002/0130137 A1* | 9/2002 | Greenwald | A47J 31/467 222/54 |
| 2003/0006638 A1 | 1/2003 | Tyler | |
| 2005/0077878 A1* | 4/2005 | Carrier | B25F 5/00 320/134 |
| 2005/0093508 A1 | 5/2005 | Taniguchi et al. | |
| 2007/0193451 A1 | 8/2007 | Brown et al. | |
| 2007/0278202 A1* | 12/2007 | Long | A47J 31/20 219/214 |
| 2008/0041231 A1 | 2/2008 | Beharry et al. | |
| 2008/0148956 A1 | 6/2008 | Maurer | |
| 2009/0084270 A1 | 4/2009 | Pinheiro | |
| 2009/0096399 A1* | 4/2009 | Chen | H01M 10/44 318/441 |
| 2009/0108806 A1 | 4/2009 | Takano et al. | |
| 2010/0192314 A1 | 8/2010 | Otsuka et al. | |
| 2011/0197389 A1 | 8/2011 | Ota et al. | |

FOREIGN PATENT DOCUMENTS

| | | | |
|---|---|---|---|
| CN | 101006898 A | | 8/2007 |
| GB | 405614 A | | 1/1934 |
| JP | S63-147146 U | | 9/1988 |
| JP | H05-26278 U | | 4/1993 |
| JP | H09-155769 A | | 6/1997 |
| JP | H10-99199 A | | 4/1998 |
| JP | H10-506316 A | | 6/1998 |
| JP | 2000-308268 A | | 11/2000 |
| JP | 2004-297957 A | | 10/2004 |
| JP | 2010-178773 A | | 8/2010 |
| WO | 00/72736 A1 | | 12/2000 |
| WO | 2009/023712 A1 | | 2/2009 |

OTHER PUBLICATIONS

Apr. 17, 2015 Extended Search Report issued in European Application No. 11830449.2.

Nov. 22, 2011 Search Report issued in International Patent Application No. PCT/JP2011/069118.

Jul. 16, 2014 Office Action issued in Chinese Patent Application No. 201180048565.1.

Feb. 20, 2018 Office Action issued in European Patent Application No. 11 830 449.2.

Sep. 10, 2019 Extended Search Report issued in European Patent Application No. 19170787.6.

* cited by examiner

ELECTRIC APPARATUS

CROSS-REFERENCE TO RELATED APPLICATION

This is a Continuation of application Ser. No. 13/823,416 filed Apr. 3, 2013, which in turn is a National Phase of International Application No. PCT/JP2011/069118 filed Aug. 25, 2011, which claims the benefit of Japanese Application No. 2010-228217 filed Oct. 8, 2010. The disclosure of the prior applications is hereby incorporated by reference herein in its entirety.

BACKGROUND OF THE INVENTION

Field of the Invention

This invention relates to a battery type electric apparatus that is convenient to use outdoors.

Description of the Related Art

In electric apparatuses such as a coffee maker, an electric hot plate, and an electric kettle, an AC voltage source of 100 volts (alternating-current voltage source) is commonly used as a power source for use in ordinary houses or offices. And the AC voltage source is used by connecting a power cord to an AC power outlet. Japanese Laid-Open Patent Publication No. 10-506316 and Japanese Laid-Open Utility Model Publication No. 63-147146 disclose techniques of using a battery as an auxiliary power source for such functions as heat retention etc., but basically, an AC power source is used as a main power source.

Accordingly, in a field where an AC power source is not available, such as in a construction site or a horticultural work site, the above-mentioned electric apparatuses cannot be used. In the past, there was not provided an electric apparatuses such as a coffee maker etc. for outdoor use that do not require an AC power source.

There is a need to provide an electric apparatus that can be used even at a construction site or a horticultural work site where no AC power source is available.

SUMMARY OF THE INVENTION

According to a first aspect of the invention, there is provided an electric apparatus having a heat generating function or a cooling function in which a battery that can be attached to an electric power tool as its power source can be used as a power source According to the first aspect of the invention, since the battery of an electric power tool is used as the battery source, the electric apparatus can be used even in a place where no AC power source is available, such as outdoors.

For example, at a house construction site, an electric drill for boring, a screw fastening apparatus for screw fastening, and a cutting tool such as a circular saw, are used very often. At a horticultural work site, horticultural tools such as a chain saw and hedge clippers are used. In these electric power tools, rechargeable batteries are normally used as the power source. Accordingly, it is possible to easily obtain batteries used for the electric power tools at the construction site or the horticultural work site, and it is possible to provide a novel convenient electric apparatus by using the batteries as the power source of the electric apparatus.

That is, by using the power of the battery of electric power tools for thermal conversion such as heat generation or cooling, it is possible to provide a battery type electric apparatus such as a coffee maker or a water heater that can be used outdoors.

According to a second aspect of the invention, there is provided an electric apparatus such as a water heater capable of boiling water or a coffee maker capable of extracting coffee by use of the heat generating function according to the first aspect. According to the second aspect of the invention, by attaching the battery of the electric power tool to the electric apparatus as the power source, it is possible to generate heat with the electric power thereof, making it possible to use an electric kettle for boiling water or to use a coffee maker.

According to a third aspect of the invention, there is provided an electric apparatus according to the first or second aspect that is capable of using batteries corresponding to two or more rated voltages. According to the third aspect of the invention, for example, either a 14.4 volts lithium ion battery or an 18 volts lithium ion battery can be attached to the electric apparatus as the power source, and thus a range of use can expand in the electric heating apparatus. Further, a switch between the batteries in conformity with a required power can suppress power consumption.

According to a fourth aspect of the invention, there is provided an electric apparatus according to one of the first to the third aspect in which a plurality of batteries can be connected to the electric apparatus in parallel and a switch between the batteries can be made to supply power. According to the fourth aspect of the invention, a plurality of batteries connected in parallel can be switched manually or automatically, which causes the electric apparatus to use continuously for a long period of time without replacing the battery or detaching it for charging.

According to a fifth aspect of the invention, there is provided an electric apparatus according to one of the first to the fourth aspect of the invention in which batteries of different voltages can be used in combination. For example, according to the fifth aspect of the invention, it is possible to attach an 18 volts lithium ion battery and a 14.4 volts lithium ion battery in series or in parallel, which causes an electric apparatus to use continuously for a long period of time. Further, when batteries having the same voltage cannot be prepared, it is possible to combine a plurality of batteries of different voltages. In this way, a usable condition of the electric apparatus can be enlarged, and the apparatus can be used easier than ever before.

According to a sixth aspect of the invention, there is provided an electric apparatus according to one of the first to the fifth aspects in which a circuit for detecting current and voltage of the battery is provided and in which power supply is shut off when an output current of not less than a predetermined value or an output voltage of not more than a predetermined value are detected. According to the sixth aspect of the invention, an overload condition that a current of not less than the predetermined value flows or an overdischarge condition that a voltage of not more than the predetermined value is produced, are properly detected to shut off the power supply, which can avoid damage of the electric apparatus, deterioration of the battery, etc, and can enhance durability of the electric apparatus.

According to a seventh aspect of the invention, there is provided an electric apparatus according to one of the first to the sixth aspect in which, when a battery whose rated voltage is above a predetermined value is inserted, power is suppressed by use of a switching element. According to the seventh aspect of the invention, it is possible to prevent damage of the electric apparatus, which can enhance durability of the electric apparatus.

According to an eighth aspect of invention, there is provided an electric apparatus according to one of the first to the seventh aspects in which a water temperature sensor is provided. According to the eighth aspect of the invention, it is possible to detect boiling of water by the water temperature sensor to shut off or suppress the power supply, which can suppress wasteful power consumption and also can enhance an added value of the electric apparatus.

According to a ninth aspect of the invention, there is provided an electric apparatus according to one of the first to the eighth aspect in which the electric apparatus has a heat retention function by which the power supply can be suppressed after the water temperature has reached a boiling point, and the water temperature can be maintained afterward. According to the ninth aspect of the invention, the water can be kept hot automatically after the boiling of water has been completed, and there is no need for a user to operate in particular in order to maintain the hot water at an appropriate temperature for a long period of time, which can enhance an added value of the electric apparatus.

According to a tenth aspect of the invention, there is provided an electric apparatus according to one of the first to the ninth aspects in which the apparatus has a cover for covering the battery. According to the tenth aspect of the invention, the battery can be waterproof and dustproof, and thus a user can use the electric apparatus in an outdoor place such as a construction site without any anxiety.

DETAILED EXPLANATION OF THE INVENTION

Figure 1:
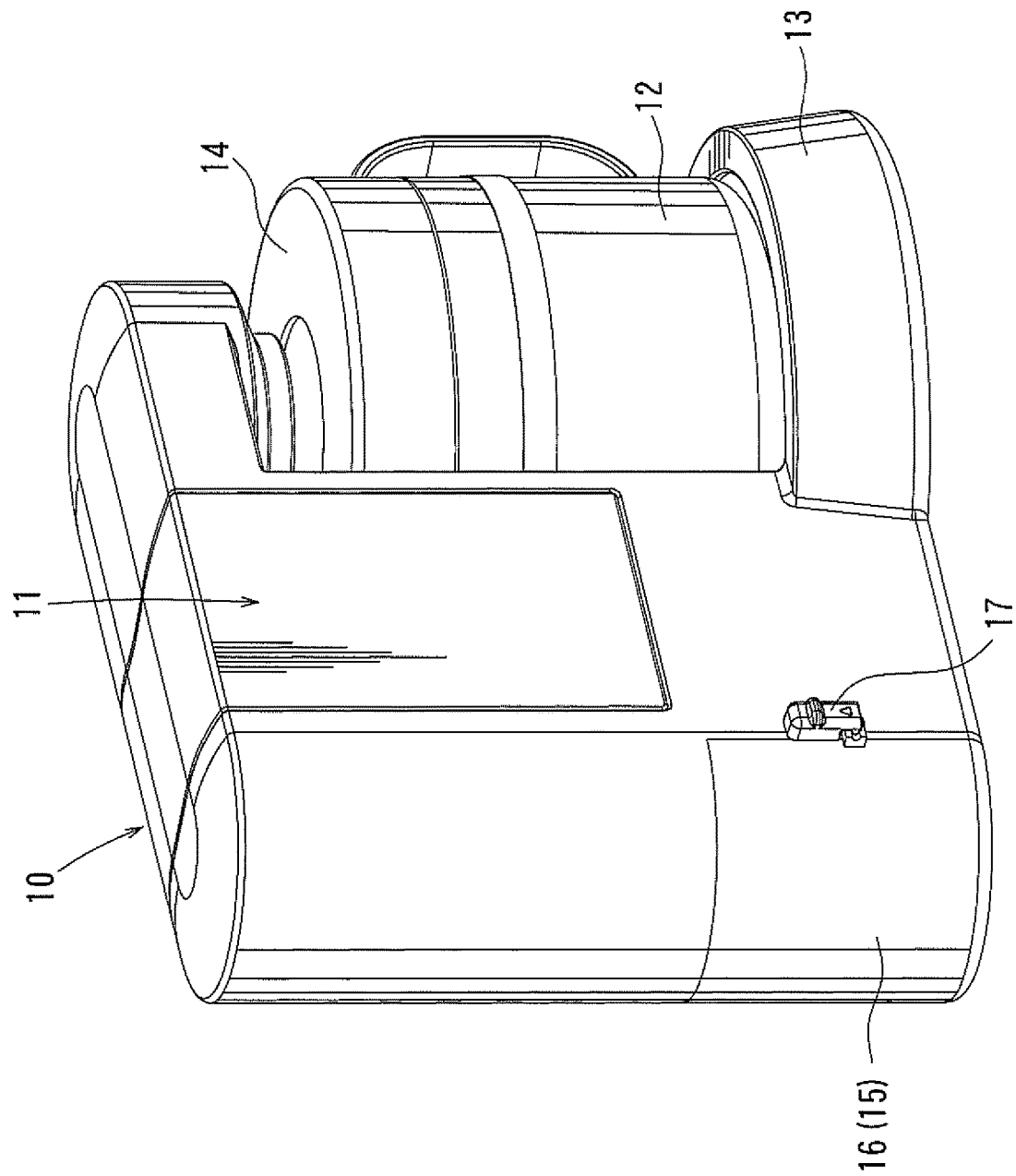
FIG. 1 is an overall perspective view of an electric apparatus according to a first embodiment. The figure shows a coffee maker as an example of the electric apparatus. The figure shows a state in which a battery storage cover closes.
Figure 2:
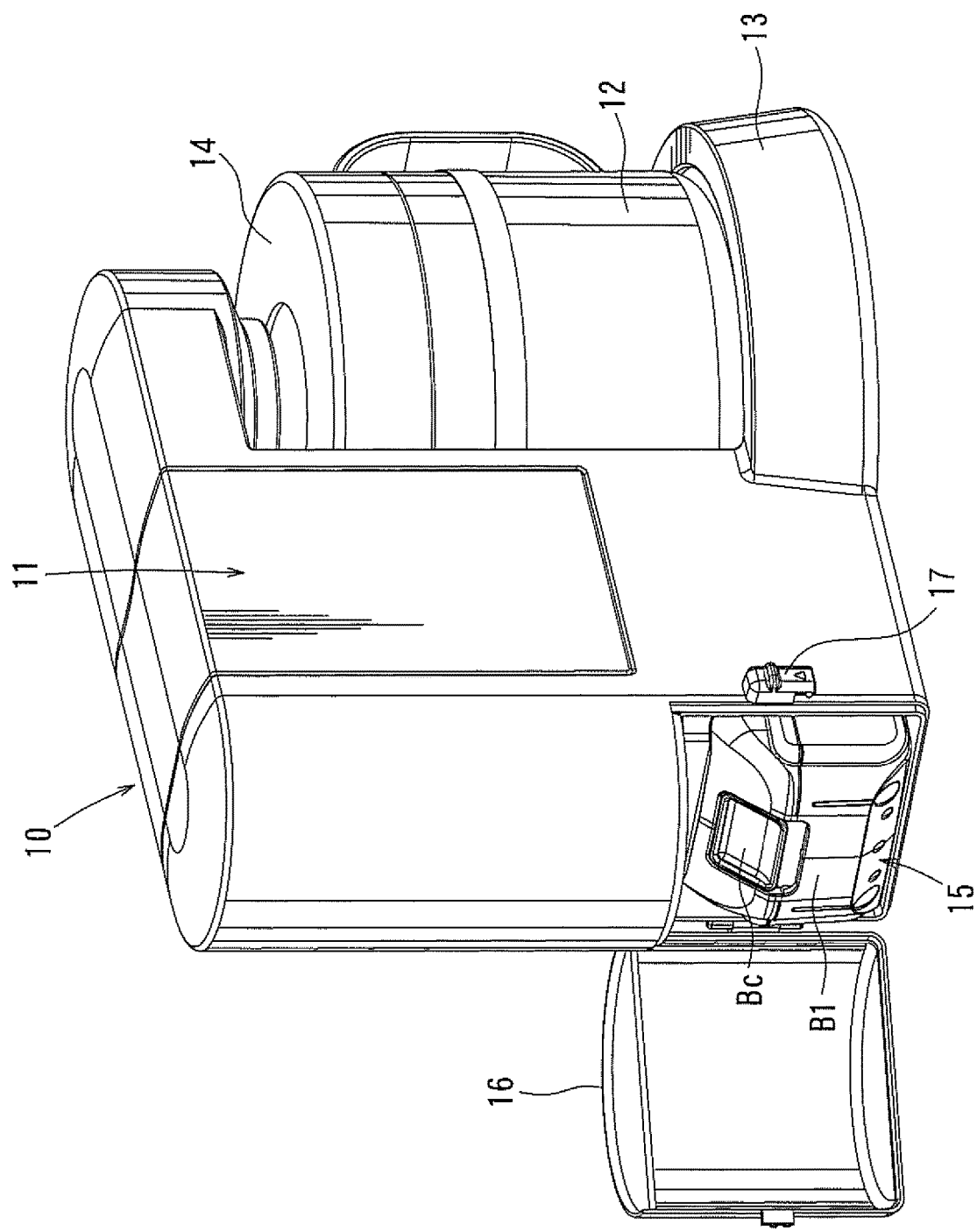
FIG. 2 is an overall perspective view of the electric apparatus according to the first embodiment. The figure shows a coffee maker as an example of the electric apparatus. The figure shows a state in which the battery storage cover opens.
Figure 3:
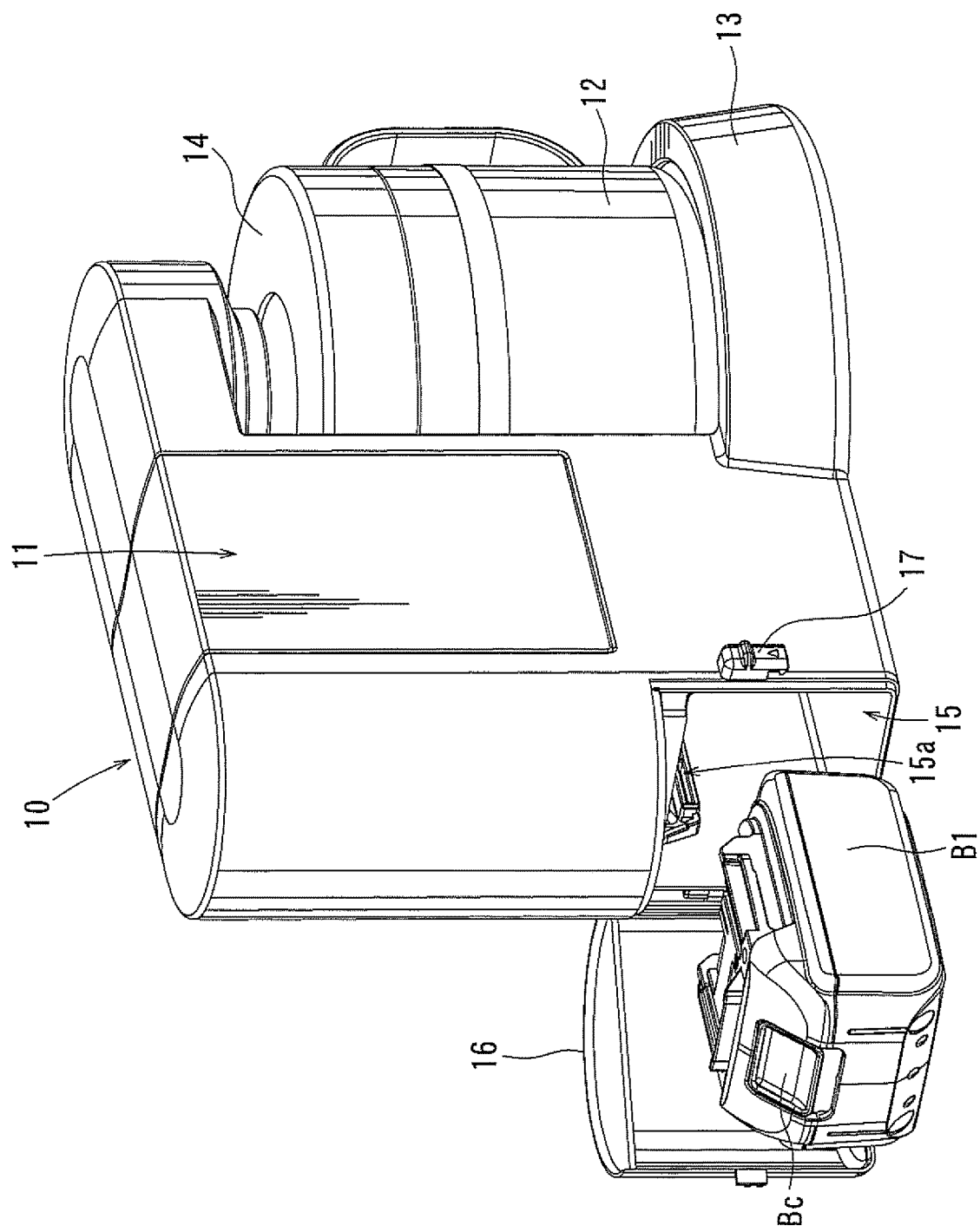
FIG. 3 is an overall perspective view of the electric apparatus according to the first embodiment. The figure shows a coffee maker as an example of the electric apparatus. The figure shows a state in which a battery is detached from a battery storage part.

Next, embodiments of the present invention will be described with reference to FIGS. 1 to 21. FIGS. 1 to 3 show an electric apparatus 10 according to the first embodiment.

In the first embodiment, a drip coffee maker is shown as an example of the electric apparatus 10. This electric apparatus 10 is provided with an apparatus main body part 11 configured to heat and boil water in a water storage tank in order to pour the boiling water onto coffer powder set above a handled decanter 12 and to drip coffee into the decanter 12. The basic construction of the apparatus main body part 11 is well known, and thus a particular change is not required in the present embodiment. In the drawing, a reference numeral 13 indicates a heat retention plate part. The decanter 12, consisting of a glass container, is placed on the heat retention plate part 13 for heat retention of the dripped coffee. A cylindrical filter case 14 is set in the spout of the decanter 14. A filter is placed in the filter case 14, and an appropriate amount of coffee powder is put in the filter.

In the electric apparatus 10 of the present embodiment, an AC power source is not used, but a rechargeable battery B1 is used as the power source. A remarkable feature of the present invention is that the rechargeable battery B1 is used in the electric apparatus as well as in an electric power tool. The other embodiments described below also have this feature.

A battery storage part 15 is provided at the rear part of the apparatus main body part 11. As shown in FIG. 2, this battery storage part 15 is opened and closed by use of a battery storage cover 16. The battery storage cover 16 is locked in a closed state by a cover stopper 17. By closing this battery storage cover 16, the inside of the battery storage part 15 and the battery B1 can be waterproof and dustproof.

As shown in FIG. 3, by opening the battery storage cover 16, it is possible to detach the battery B1 attached to the battery storage part 15. In the first embodiment, an 18 volts battery B1 is used. This battery B1 can be recharged by a separately prepared charger, and is allowed to use repeatedly. A battery attaching part 15a is provided at the top of the battery storage part 15. By sliding the battery B1 with respect to the battery attaching part 15a, it is possible to attach and detach the battery B1 to and from the inside of the battery attaching part 15a. When the battery B1 is attached to the battery attaching part 15a, this battery B1 is electrically connected to an electric circuit provided inside the apparatus main body part 11.

Figure 21:
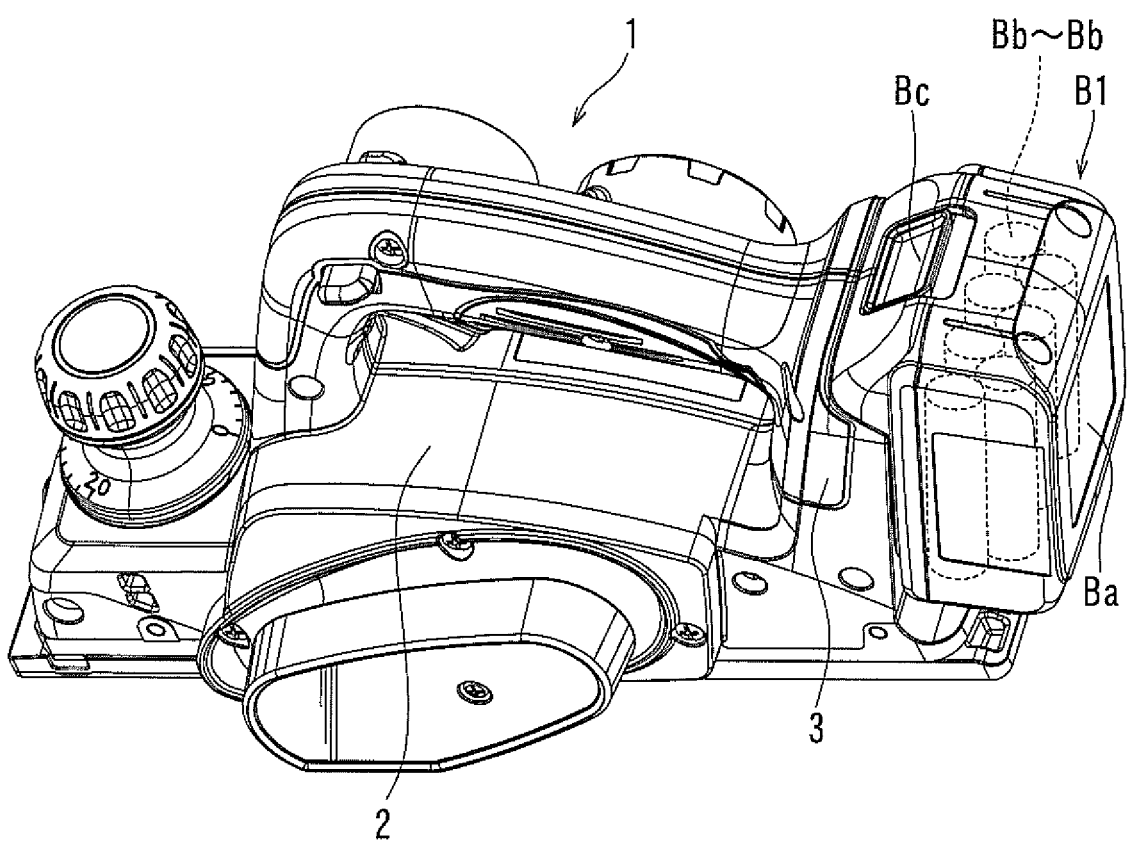
FIG. 21 is an overall perspective view of a battery type electric power tool. The figure shows a battery type electric planer as an example of the electric power tool.

As stated above, the battery B1 is used as the power source of an electric power tool. FIG. 21 shows an electric power tool 1 to which this battery B1 is attached. FIG. 21 shows a rechargeable electric planer as an example of the electric power tool 1. This electric power tool 1 is provided with a battery attaching part at the rear part of a tool main body part 2. By sliding the battery B1 downward from above with respect to this battery attaching part 3, the battery B1 can be attached. In an opposite manner, by sliding the battery B1 upward with a lock button Bc depressed using a fingertip, the battery B1 can be detached from the battery attaching part 3.

As shown in the drawing, this battery B1 is referred to as a battery pack which has a plurality of battery cells Bb inside a battery case Ba. Corresponding to a necessary output voltage, appropriate quantities of battery cells Bb are provided. The battery B1 that is detached from the battery attaching part 3 of the tool main body part 2 can be used as the power source of the electric apparatus 10. In the first embodiment, the electric apparatus 10 in which the single battery B1 is used as its power source is shown as an example.

Figure 4:
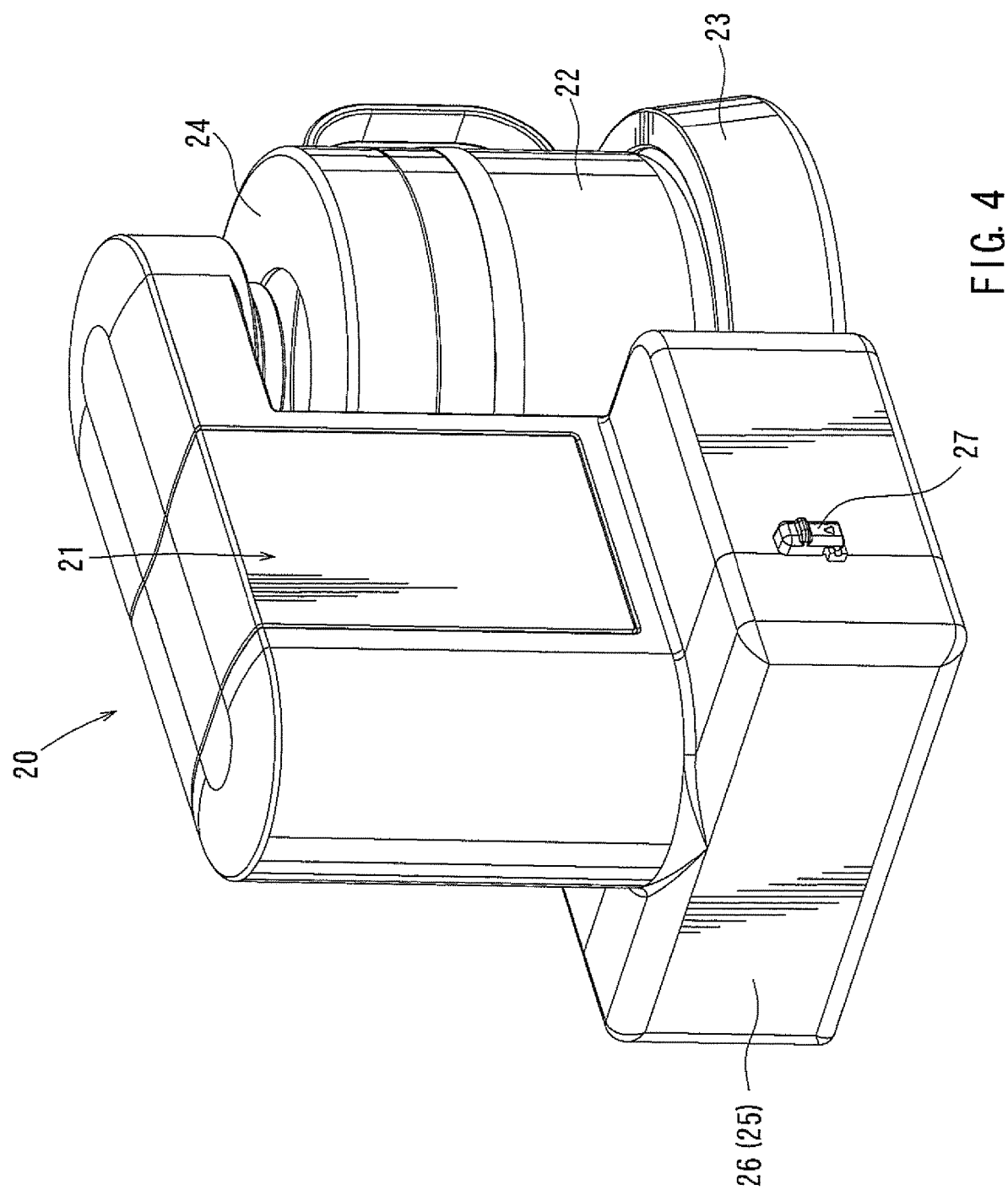
FIG. 4 is an overall perspective view of the electric apparatus according to a second embodiment. The figure shows a coffee maker as an example of the electric apparatus. The figure shows a state in which the battery storage cover closes.
Figure 5:
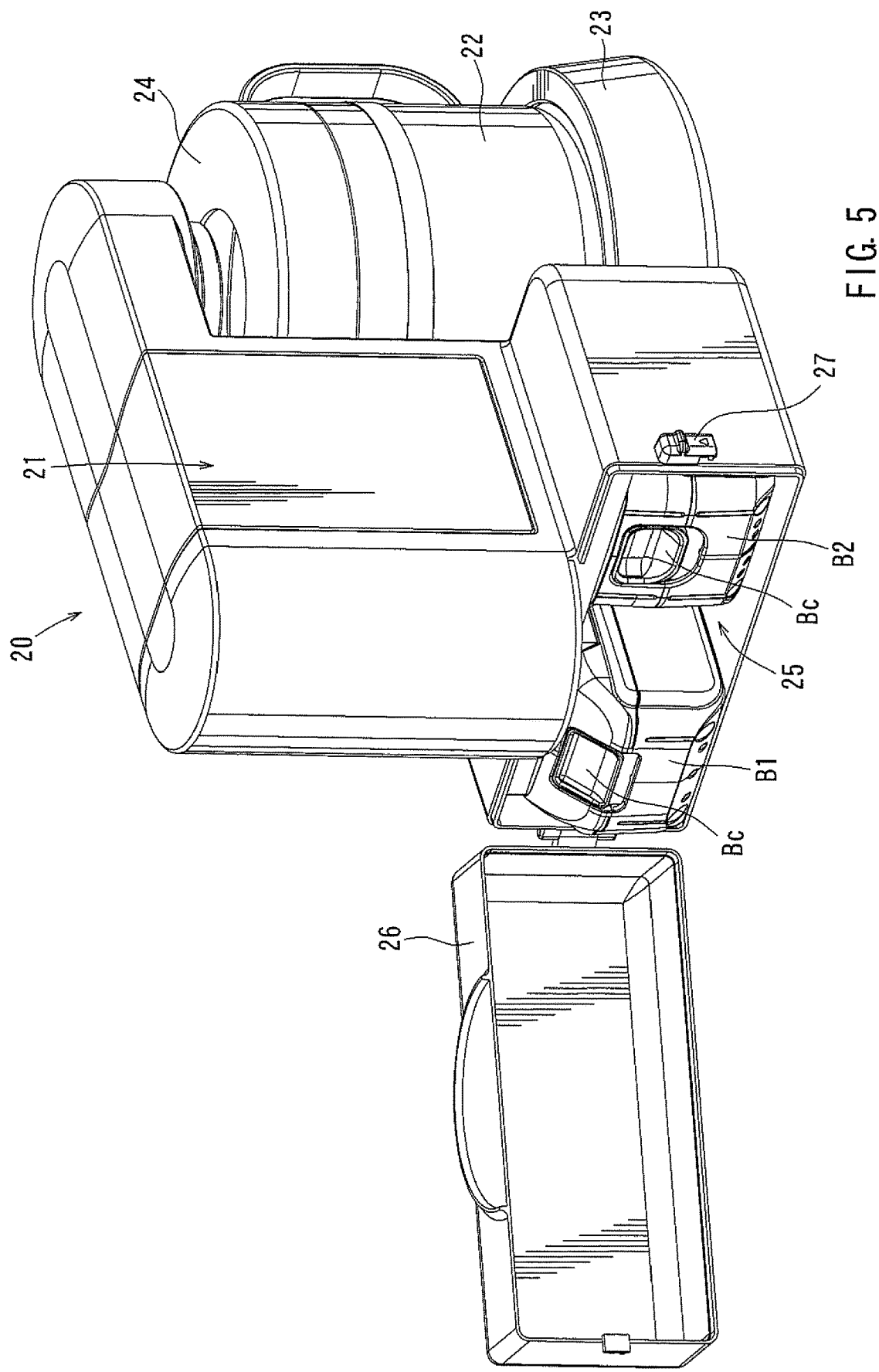
FIG. 5 is an overall perspective view of the electric apparatus according to the second embodiment. The figure shows a coffee maker as an example of the electric apparatus. The figure shows a state in which the battery storage cover opens.
Figure 6:
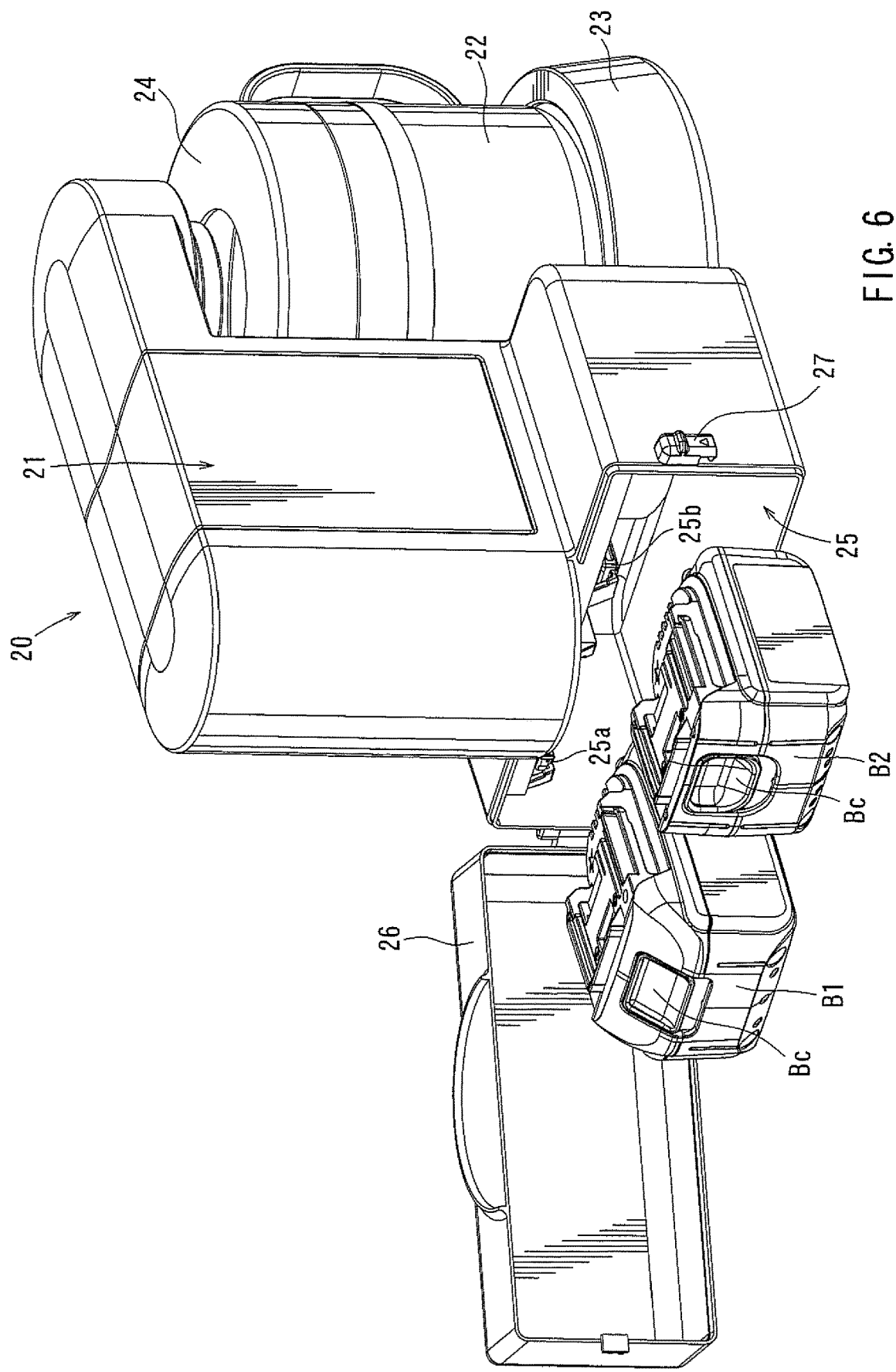
FIG. 6 is an overall perspective view of the electric apparatus according to the second embodiment. The figure shows a coffee maker as an example of the electric apparatus. The figure shows a state in which a battery is detached from a battery storage part.

FIGS. 4 to 6 show an electric apparatus 20 according to a second embodiment in which two batteries B1 and B2 that differ in an output voltage are used. In the second embodiment, an 18 volts lithium ion battery B1 and a 14.4 volts lithium ion battery B2 are used as the power source. As described above, the former 18 volts battery B1 is used as the battery of the electric planer 1, and the latter 14.4 volts battery B2 is used as a battery of another electric power tool such as an electric drill.

This electric apparatus 20 is also a coffee maker that is provided with an apparatus main body part 21, a decanter 22, a heat retention plate 23, and a filter case 24. A battery storage part 25 is provided at the end part of the apparatus main body part 21. This battery storage part 25 is opened and closed by a battery storage plate 26. The battery storage cover 26 is locked in a closed state by a cover stopper 27. By closing this battery storage cover 26, the inside of the battery storage part 25 and the batteries B1 and B2 can be waterproof and dustproof.

As shown in FIGS. 5 and 6, by opening this battery cover 26, it is possible to attach and detach the two batteries B1 and B2. The battery storage part 25 can house the two batteries B1 and B2, and two battery attaching parts 25a and 26b are provided at the top part of the part. In FIG. 6, the 18 volts battery B1 is attached to the left-hand side battery attaching part 25a, and the 14.4 volts battery B2 is attached to the right-hand side battery attaching part 25b. Each of the two batteries B1 and B2 can be detached by sliding backward with the lock button Bc depressed using a fingertip.

Figure 7:
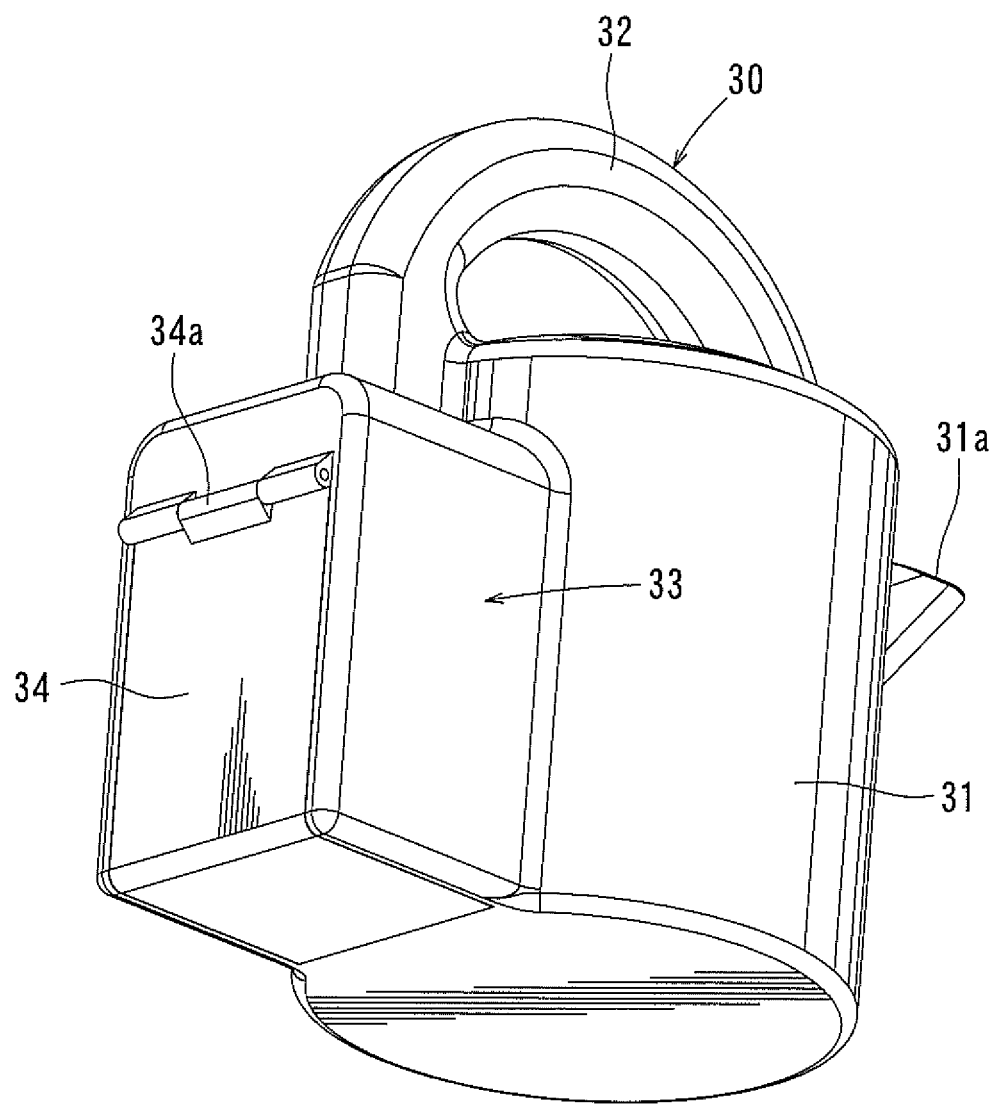
FIG. 7 is an overall perspective view of an electric apparatus according to a third embodiment. The figure shows an electric kettle as an example of the electric apparatus. The figure shows a state in which a battery storage cover closes.
Figure 8:
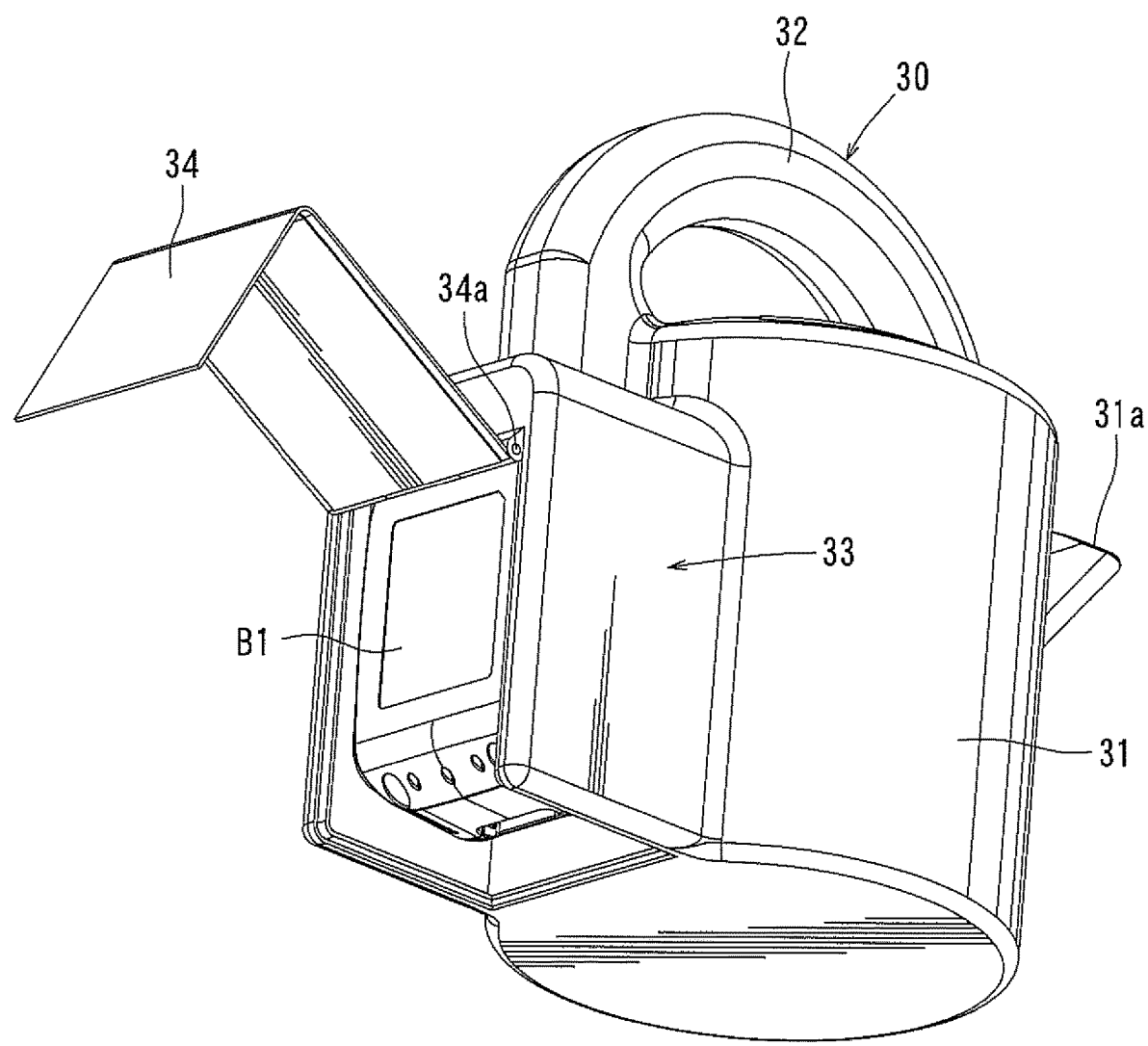
FIG. 8 is an overall perspective view of the electric apparatus according to the third embodiment. The figure shows an electric kettle as an example of the electric apparatus. The figure shows a state in which the battery storage cover opens.
Figure 9:
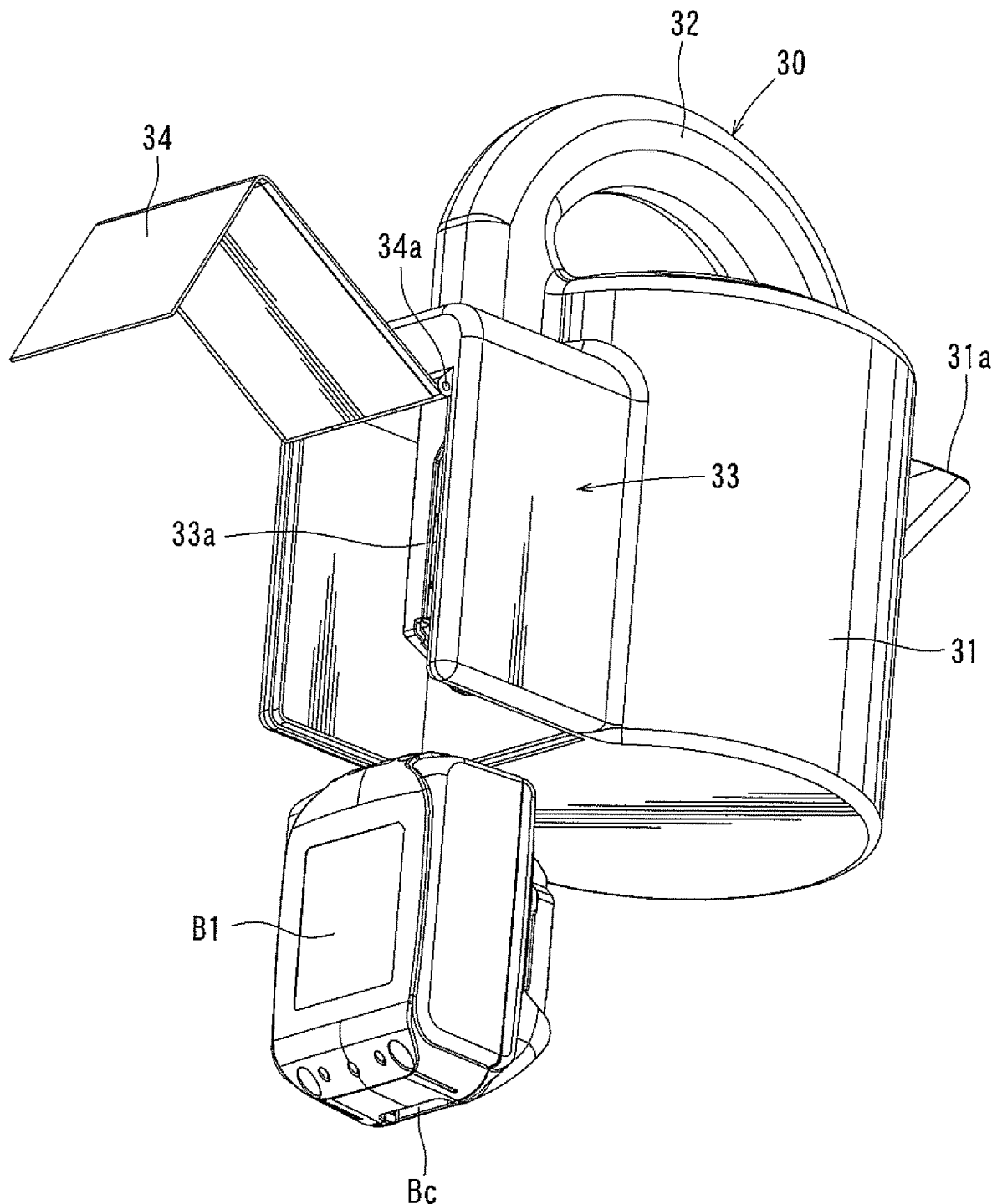
FIG. 9 is an overall perspective view of the electric apparatus according to the third embodiment. The figure shows an electric kettle as an example of the electric apparatus. The figure shows a state in which a battery is detached from the battery storage part.

FIGS. 7 to 9 show an electric apparatus 30 according to a third embodiment. In third embodiment, an electric kettle is shown as an example of the electric apparatus 30. This electric apparatus 30 is provided with a cylindrical apparatus main body part 31 that includes a heater (electric heater), and a handle 32 at the top part thereof. A spout 31 is provided at the front part of the apparatus main body part 31. It is possible to pour out hot water through this spout 31a. In an opposite manner, it is possible to pour water into the apparatus main body part 31 through this spout 31a.

A battery storage part 33 is provided at the rear part of the apparatus main body part 31. As shown in FIG. 8, this battery storage part 33 can be opened and closed by use of a battery storage cover 34. The battery storage cover 34 can be opened and closed by being vertically rotated via a hinge part 34a. By closing this battery storage cover 34, the inside of the battery storage part 33 and the battery B1 can be waterproof and dustproof.

As shown in FIG. 9, one battery B1 is attached to this battery storage part 33. An 18 volts lithium ion battery is used as the battery B1 as well as in the first and third embodiment, and also it can be used as a power source of the electric planer 1 shown in FIG. 21.

A slide type battery attaching part 33a is provided at the bottom part of the battery storage part 33. The battery B1 can be attached by sliding upward with respect to the battery attaching part 33a. In an opposite manner, it can be detached by sliding downward with the lock button Bc depressed using a fingertip. In the electric apparatus 30 according to the third embodiment, it is possible to boil water in the battery main body part 31 by the use of the battery B1 as the power source. The battery B1 can be detached from the battery storage part 32. Then, it can be recharged by a separately prepared charger and is allowed to use repeatedly.

Figure 10:
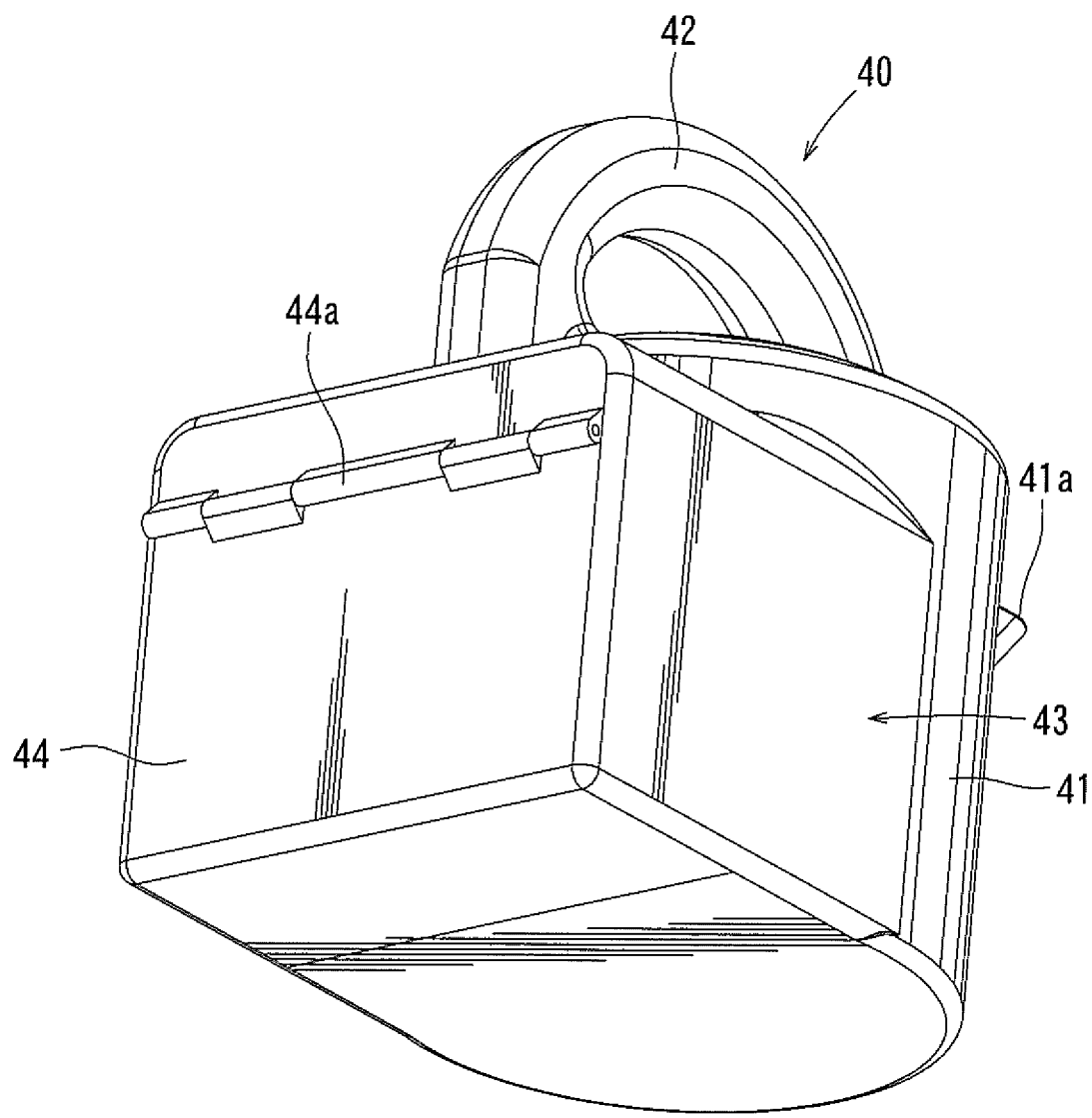
FIG. 10 is an overall perspective view of an electric apparatus according to a fourth embodiment. The figure shows an electric kettle as an example of the electric apparatus. The figure shows a state in which a battery storage cover closes.
Figure 11:
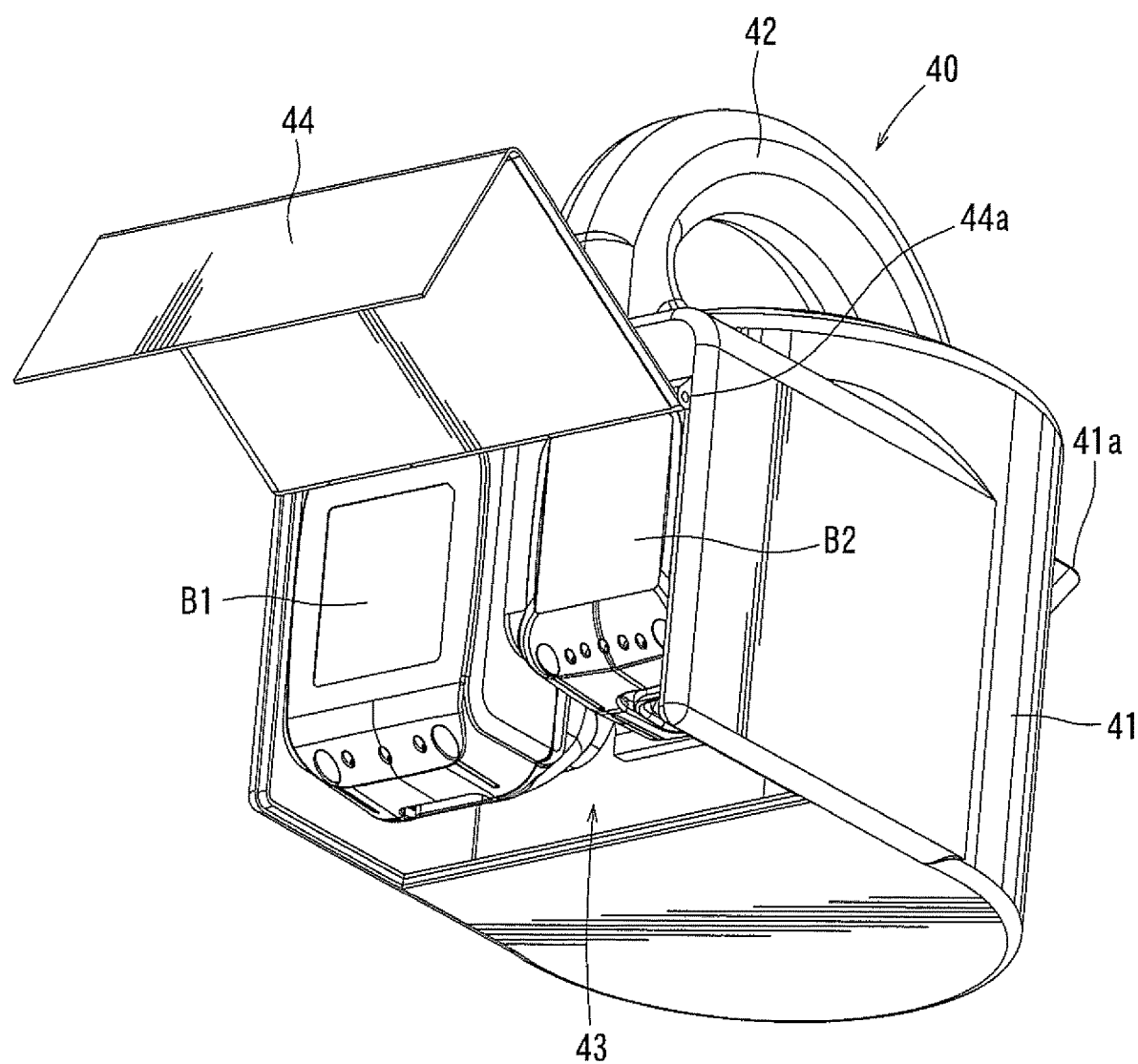
FIG. 11 is an overall perspective view of the electric apparatus according to the fourth embodiment. The figure shows an electric kettle as an example of the electric apparatus. The figure shows a state in which the battery storage cover opens.
Figure 12:
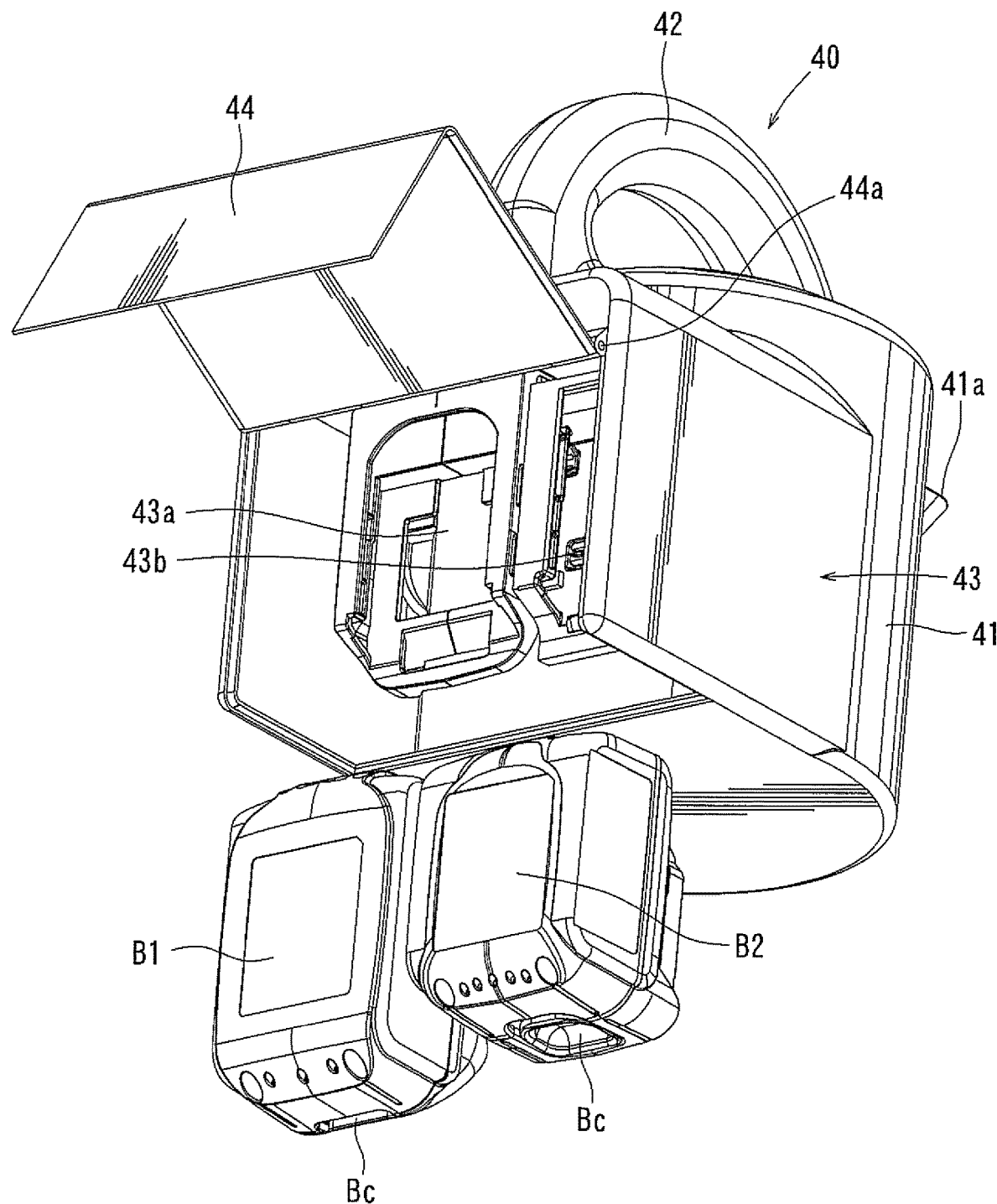
FIG. 12 is an overall perspective view of the electric apparatus according to the fourth embodiment. The figure shows an electric kettle as an example of the electric apparatus. The figure shows a state in which a battery is detached from the battery storage part.

FIGS. 10 to 12 show an electric apparatus 40 according to a fourth embodiment. In the fourth embodiment, an electric kettle is shown as an example of the electric apparatus 40. This electric apparatus 40 is provided with a cylindrical apparatus main body part 41 that includes a heater, and a handle 42 at the top part thereof. A spout 41a is provided at the front part of the apparatus main body 41. A battery storage part 43 is provided at the rear part of the apparatus main body part 41. As shown in FIG. 11, this battery storage part 43 can be opened and closed by use of a battery storage cover 44. The battery storage cover 44 can be opened and closed by being vertically rotated via a hinge part 44a. As in the second embodiment, two batteries B1 and B2 that differ in an output voltage can be attached to the battery storage part 43. By closing the battery storage cover 44, the inside of the battery storage part 43 and the batteries B1 and B2 can be waterproof and dustproof.

An 18 volts lithium ion battery is used as the battery B1, and a 14.4 volts lithium ion battery is used as the battery B2. Both can be detached from the battery storage part 43, and they can be used as the power source of an electric power tool such as the electric planer 1 or the electric drill. At the bottom part of the battery storage part 43, there are provided slide type battery attaching parts 43a and 43b for attaching the batteries B1 and B2. When respectively attached to the battery attaching parts 43a and 43b, the batteries B1 and B2 are electrically connected to a power source circuit provided inside the apparatus main body part 41.

Figure 13:
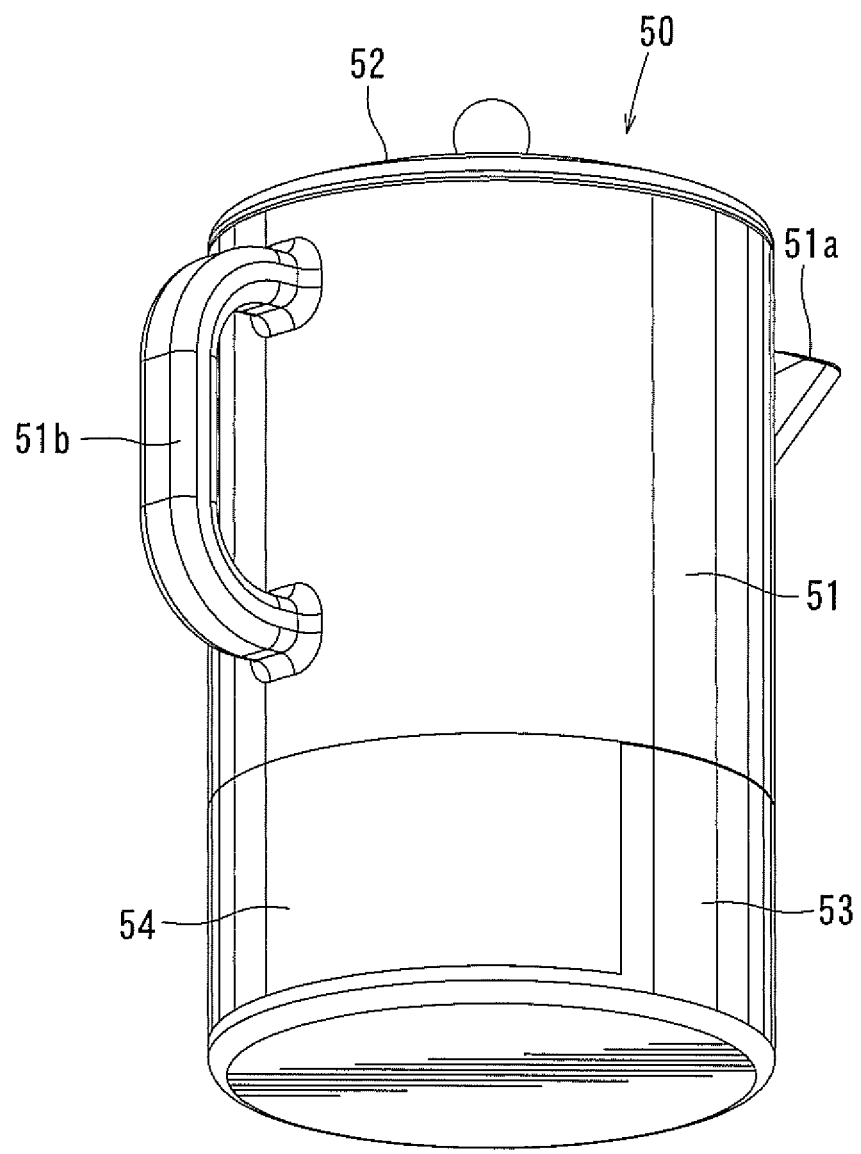
FIG. 13 is an overall perspective view of an electric apparatus according to a fifth embodiment. The figure shows an electric kettle as an example of the electric apparatus. The figure shows a state in which a battery storage cover closes.
Figure 14:
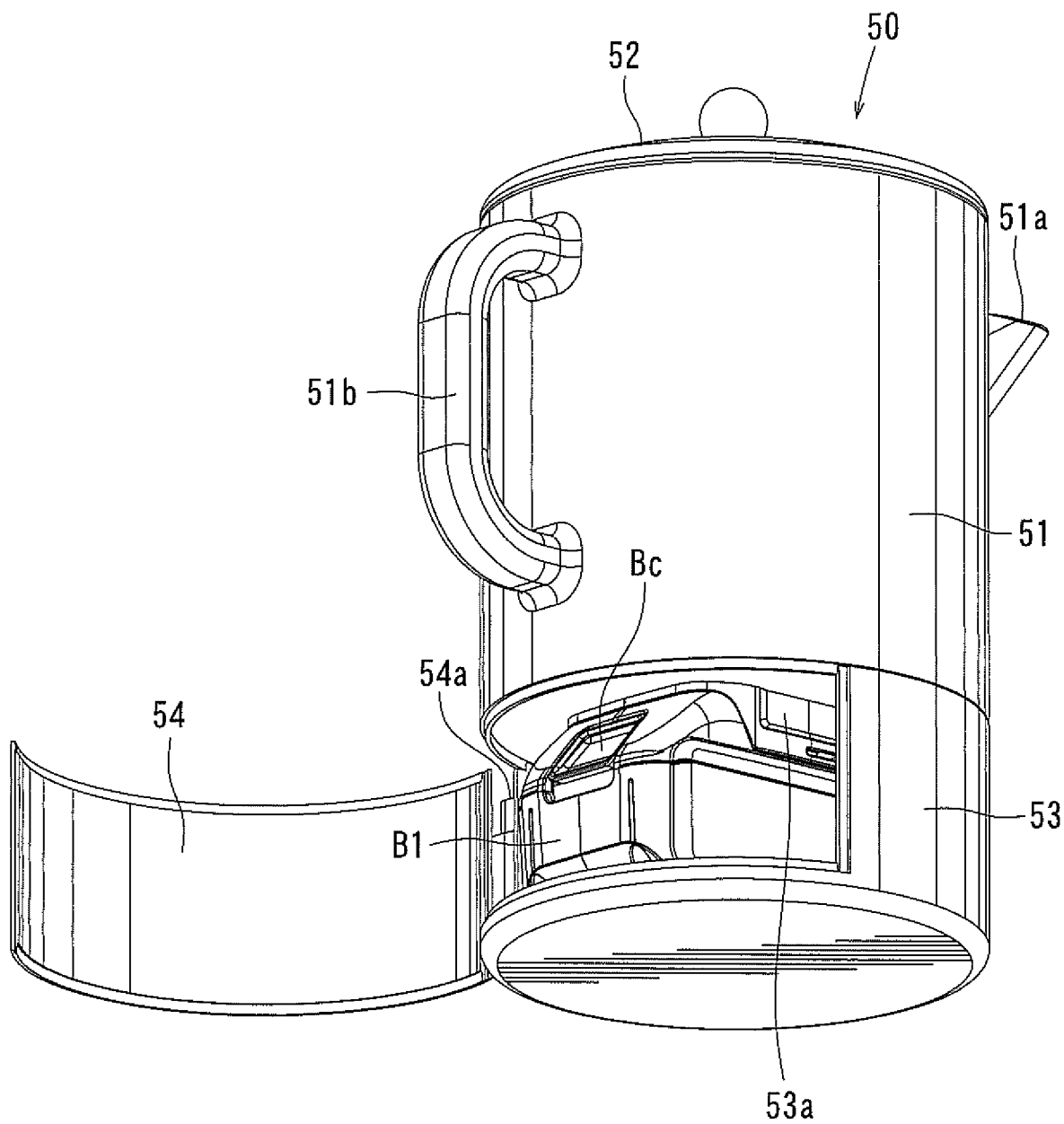
FIG. 14 is an overall perspective view of the electric apparatus according to the fifth embodiment. The figure shows an electric kettle as an example of the electric apparatus. The figure shows a state in which the battery storage cover opens.
Figure 15:
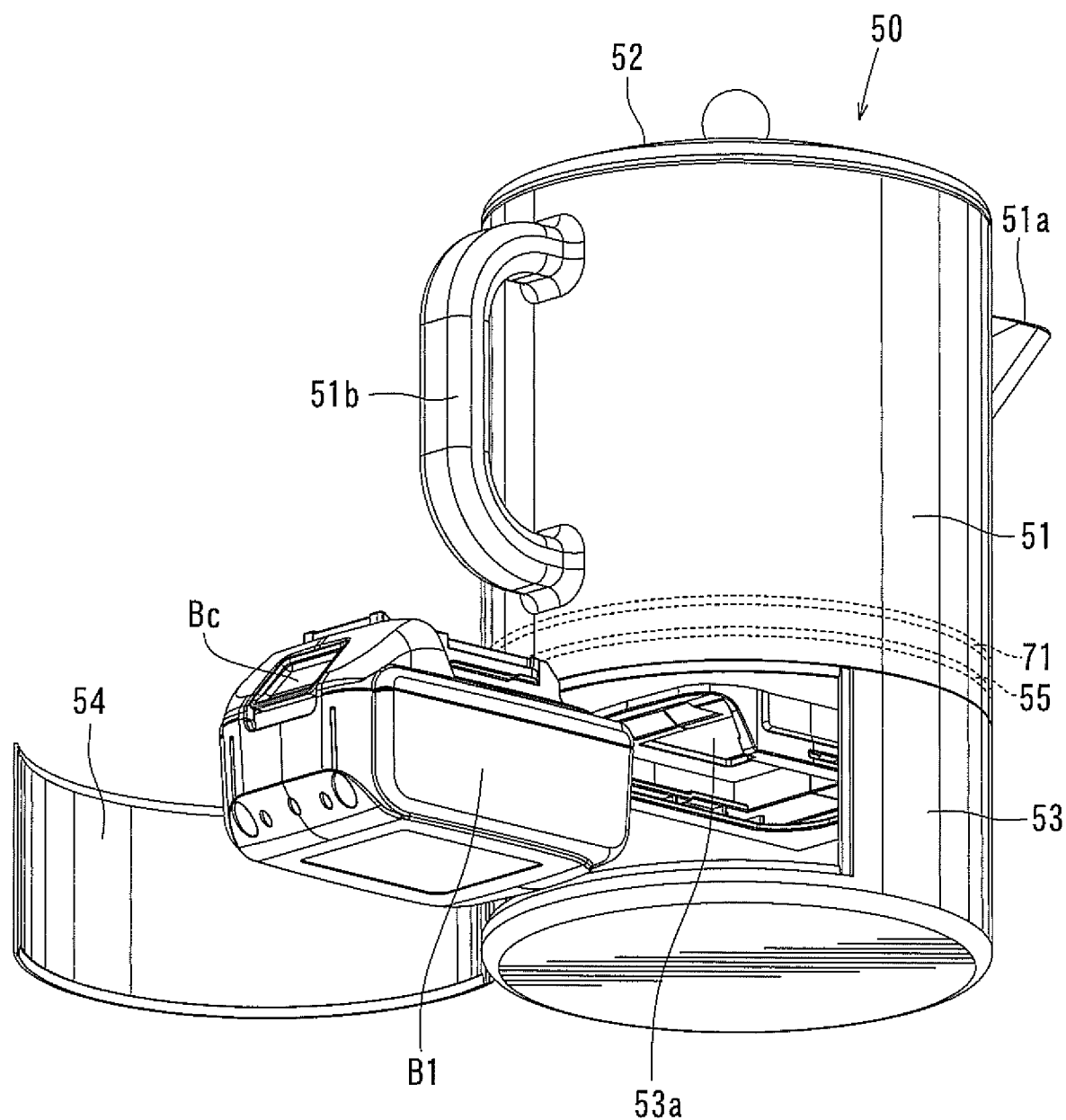
FIG. 15 is an overall perspective view of the electric apparatus according to the fifth embodiment. The figure shows an electric kettle as an example of the electric apparatus. The figure shows a state in which a battery is detached from the battery storage part.

FIGS. 13 to 15 show an electric apparatus 50 according to a fifth embodiment. In the fifth embodiment, an electric kettle is shown as an example of the electric apparatus 50. This electric apparatus 50 is provided with a cylindrical apparatus main body part 51 that includes a heater, and a cover 52 for closing an opening at the top part thereof. A spout 51a is provided at the front part of the apparatus main body part 51, and a handle 51b is provided at the rear part thereof. By opening the cover 52, it is possible to pour water into the apparatus main body 51, and the water can be boiled and the boiled water can be poured out through the spout 51a.

A column-shape battery storage part 53 is provided at the lower part of the apparatus main body part 51. In the fifth embodiment, the battery storage part 53 is provided in the same size (diameter) as the apparatus main body 51, which may produce a sense of unity with the apparatus main body part 51. This battery storage part 53 can be opened and closed by use of a horizontal-opening-type battery storage cover 54. By closing this battery storage cover 54, the inside of the battery storage part 53 and the battery B1 can be waterproof and dustproof.

As shown in FIG. 14, the battery storage cover 54 can be opened and closed by being rotated horizontally via a hinge part 54a. An 18 volts lithium ion battery B1 can be attached to the battery storage part 53. By use of the battery B1 as the power source, it is possible to supply power to a heater in the apparatus main body 51, making it possible to boil water stored in the apparatus main body part 51. As described below, after the water is boiled, the apparatus is switched to a heat retention mode, thereby suppressing power consumption.

As shown in FIG. 15, when the battery storage cover 54 is opened and the battery B1 is caused to slide to the front side with the lock button Bc depressed using a finger tip, it is possible to detach this battery B1 from the battery storage part 53. The detached battery B1 can be recharged by a separately prepared charger, and can be used repeatedly.

A slide type battery attaching part 53a is provided at the top part of the battery storage part 53. The configuration of the battery attaching part 53a is compatible with that of the battery attaching part 3 of the electric power tool 1.

A heat insulating material 55 is provided between the battery B1 and a heater 71. Due to the heat insulating material, the heat of the heater 71 of high temperature and also the heat of the boiled water stored in the apparatus main body part 51 cannot be easily conducted to the battery B1. Generally speaking, the higher the temperature of a battery, the shorter an operating life of the battery. However, due to the heat insulating material, it is possible to prevent a rise in temperature of the battery B1, which can increase the operating life of the battery B1.

Figure 16:
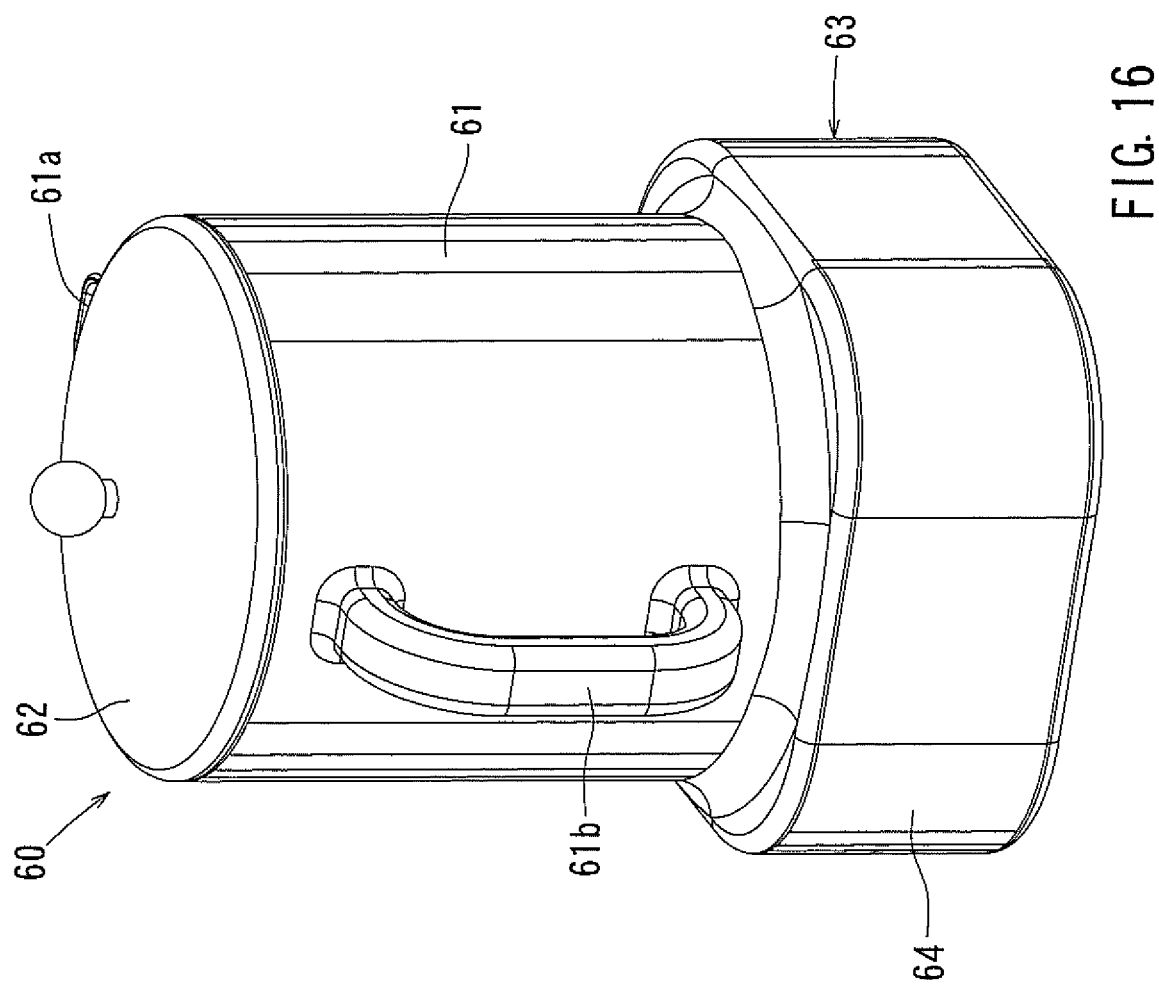
FIG. 16 is an overall perspective view of an electric apparatus according to a sixth embodiment. The figure shows an electric kettle as an example of the electric apparatus. The figure shows a state in which a battery storage cover closes.
Figure 17:
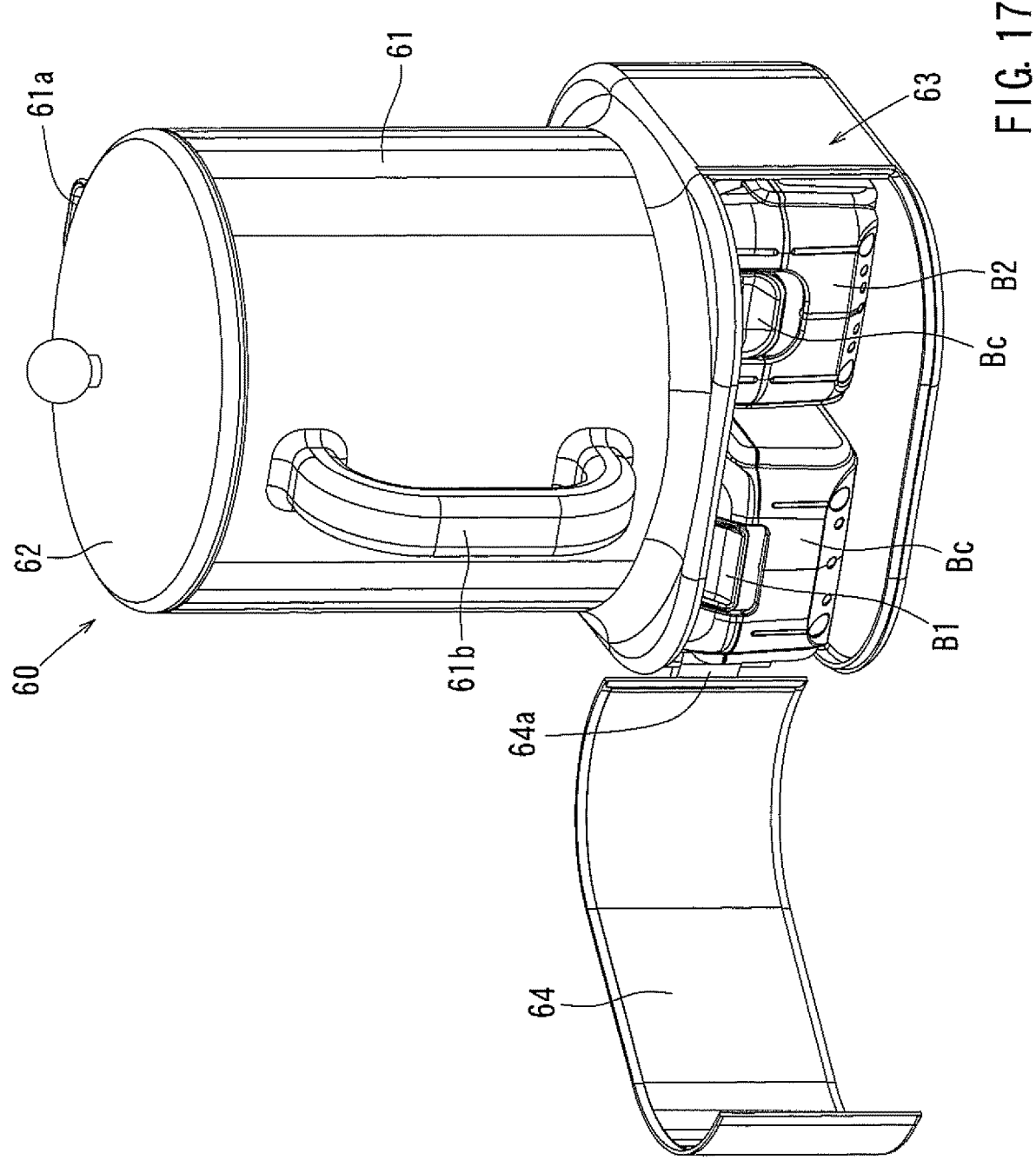
FIG. 17 is an overall perspective view of the electric apparatus according to the sixth embodiment. The figure shows an electric kettle as an example of the electric apparatus. The figure shows a state in which the battery storage cover opens.
Figure 18:
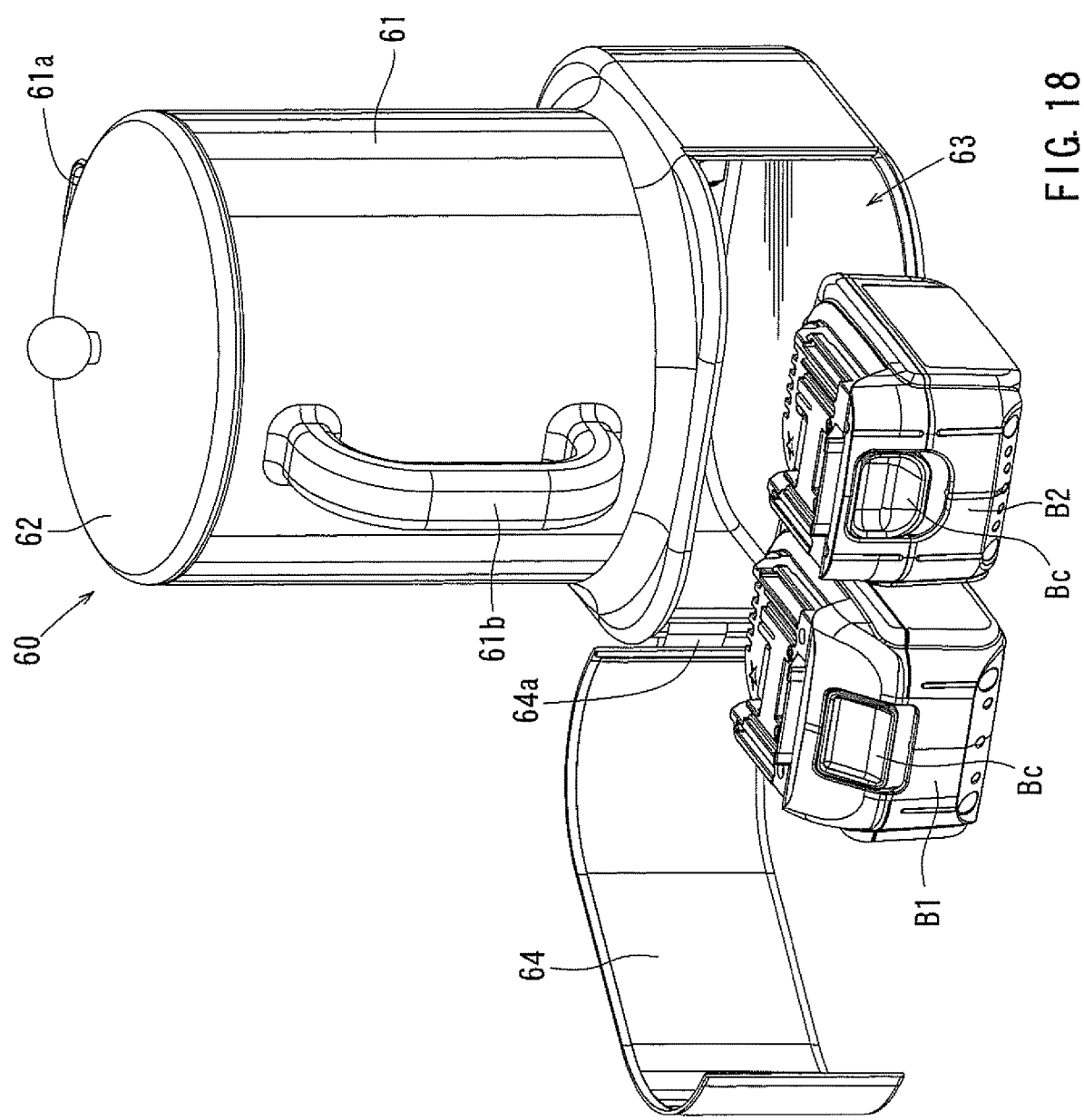
FIG. 18 is an overall perspective view of the electric apparatus according to the sixth embodiment. The figure shows an electric kettle as an example of the electric apparatus. The figure shows a state in which a battery is detached from the battery storage part.

FIGS. 16 to 18 show an electric apparatus 60 according to a sixth embodiment. An electric kettle is shown as an example of the electric apparatus 60, as well as in the fifth and sixth embodiment. At the top part of a cylindrical main body part 61 that includes a heater, there is provided a cover 62 that can be opened and closed. A spout 61a is provided at the front part of the apparatus main body part 61, and a handle 61b is provided at the rear part thereof.

A battery storage part 63 is provided below the apparatus main body part 61. The battery storage part 63 is a little bit larger than the battery storage part 53 of the fifth embodiment, and it has a rectangular-box shape. Due to this battery storage part 63, the apparatus main body part 61 has a sense of stability in terms of placement. In the sixth embodiment, two batteries B1 and B2 can be attached to the battery storage part 63. As shown in FIG. 18, the battery storage part 63 is provided with a horizontal-opening-type battery storage cover 64, as in the fifth embodiment. This battery storage cover 64 can be opened and closed by being horizontally rotated via a hinge part 64a. By closing this battery storage cover 64, the inside of the battery storage part 63 and the batteries B1 and B2 can be waterproof and dustproof.

As shown in FIG. 18, when the battery storage cover 64 is opened and the batteries B1 and B2 are caused to slide to the front side with both the lock buttons Bc depressed using fingertips, it is possible to detach the batteries B1 and B2 from the battery storage part 63. An 18 volts lithium ion battery is used as the battery B1 and a 14.4 volts lithium ion battery is used as the battery B2, as well as in the second and fourth embodiments. These batteries can be used as the power source of an electric power tool 1 (electric planner) or other tools such as an electric drill etc. By being recharged by a separately prepared charger, the batteries B1 and B2 can be used repeatedly.

In the above first to sixth embodiment, an AC power source is not used as the power source of the electric apparatus 10, 20, 30, 40, 50, 60, and a rechargeable battery B1, B2 are used instead. The battery B1 is an 18 volts lithium ion battery, which is also used as the power source of the rechargeable electric power tool 1 (electric planer) and can be detached from the battery attaching part 3 thereof. Further, the battery B2 is a 14.4 volts lithium ion battery, which is also used as the power source of rechargeable electric power tools such as an electric drill and a screw fastener etc.

According to the above-described embodiments, when using the rechargeable electric power tool 1 such as an electric planer or a hedge clipper at a construction site or a horticultural work site in a park or the like, where it is rather difficult to obtain an AC power source, the battery B1 (B2) can be temporarily detached from the battery attaching part 3 of the electric power tool 1, and attached to the battery storage part 15, 25, 33, 43, 53, 63. Owing to this, it is possible to use the electric apparatus 10, 20, 30, 40, 50, 60 such as a coffee maker, an electric kettle or the like in such a situation. As in the case of the electric power tool 1, the battery B1, B2 can be used repeatedly by being recharged by a charger.

Next, a heater control circuit 70 will be described that can be applied to both the electric apparatuses 10 and 20 according to the above-described first and second embodiments. Regarding this heater control circuit 70, it will be described as applied to the electric apparatus 20 of the second embodiment (a coffee maker). By a heater 71, the water stored in the apparatus main body part 21 is heated, and at the same time, the heat retention plate 23 is warmed.

Figure 19:
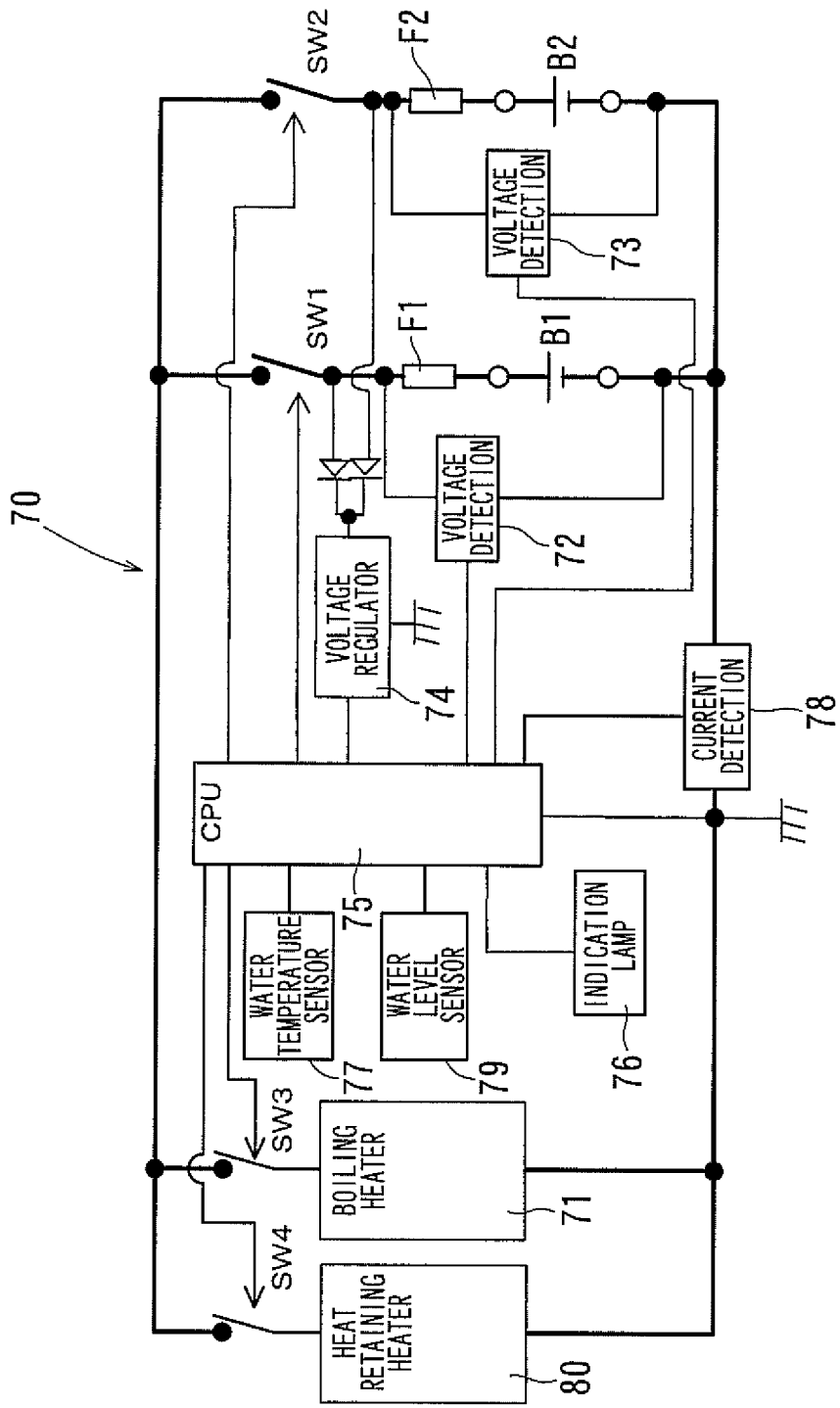
FIG. 19 is a block diagram showing a control circuit of the coffee maker according to the first or second embodiment.

FIG. 19 is a block diagram showing the heater control circuit 70. The heater 71 provided in the electric apparatus 20 can be temperature-controlled by the control circuit 70. The batteries B1 and B2 attached to the battery storage part 25 are electrically connected to the control circuit 70.

When the battery B1 and/or B2 is attached to the battery storage part 25, power is supplied to a voltage regulator 74 via F1, F2 and a diode D1, D2. As a result, a fixed voltage can be applied to a CPU 75, which causes the CPU 75 to operate. In this case, 5 volts is supplied to the CPU 75 from the voltage regulator 74.

The voltages of the two batteries B1 and B2 are respectively detected by voltage detection elements 72 and 73. Detected voltages of the batteries B1 and B2 are input to the CPU 75.

When the CPU 75 detects signs showing that the batteries B1 and B2 are attached and also detects water to be boiled by a water level sensor 79, the CPU 75 closes a switch SW1 or SW2. Generally, the switches SW1 and SW2 are electronic switches such as field effect transistors (FET) or mechanical switches such as relays.

After that, a switch SW3 is closed and power is supplied to the boiling heater 71. An electronic switch such as a field effect transistor can be used as the switch SW3. The CPU 75 controls an ON/OFF of the switch SW3 based on the voltage data detected by the voltage detection elements 72, 73 and also based on the rated voltage of the boiling heater 71. For example, when the rated voltage of the boiling heater 71 is 14.4 volts and the voltage of the battery B1 is 18 volts, a ration of a closing time to an opening time of the switch SW3 is set as follows.
(closing time of the switch SW3):(opening time of the switch SW3)=1:4
In this way, an average voltage applied to the boiling heater 71 can be set to 14.4 volts, which can suppress power consumption and prevent damage of the boiling heater 71.

Similarly, in a case where a rated voltage of the boiling heater 71 is 14.4 volts, and the voltage of the battery B1 is 14.4 volts, the switch SW3 is set to be constantly ON, which can use the boiling heater 71 without damage. While the power is being supplied to the boiling heater 71, an indication lamp 76 is kept on, indicating that the water is during heating.

Due to this method, the battery that can be used in the first and second embodiments may have any voltage level so long as the battery can be physically connected. For example, by using a high voltage battery such as a 36 volts battery, it is possible to increase the amount of water to be boiled and to increase a heat retention time, thus making it possible to increase an added value of the electric apparatuses 10 and 20.

In FIG. 6, an 18 volts battery is used in the battery attaching part 25a and a 14.4 volts battery is used in the battery attaching part 25b. However, the above construction may not be limited by the above-described example. By using this method, a user can use the apparatus without having to be especially conscious of a position where the battery is inserted.

A water temperature sensor 77 detects the temperature of the water stored in the apparatus main body part 21. The water temperature sensor 77 detects a boiled water temperature, and the detected water temperature is input to the CPU 75. The water vaporized by boiling is cooled afterward, and then it drips in the filter case 24. The steam thus cooled drips onto the coffee powder put in the filter case 24, whereby coffee is extracted in the decanter 22.

When there is no water to be detected by a water level sensor 79, the CPU 75 shuts off the power supply to the boiling heater 71. That is, the switch SW3 is opened. Further, as in the case of the boiling heater 71, a switch SW4 is turned on and off so that a suitable power can be supplied to a heat retention heater 80.

When the voltage of the battery B1 being used becomes less than a predetermined value during the power is supplied to the boiling heater 71 or the heat retention heater 80, the switch SW1 is forced to open, and then the switch SW2 is closed. This will ensure that the power can be continuously supplied to the boiling heater 71 or the heat retention heater 80. As a result, water boiling or heat retention can continue for a long period of time without a special operation by a user. In this way, it is possible to increase an added value of the electric apparatuses 10 and 20.

Figure 20:
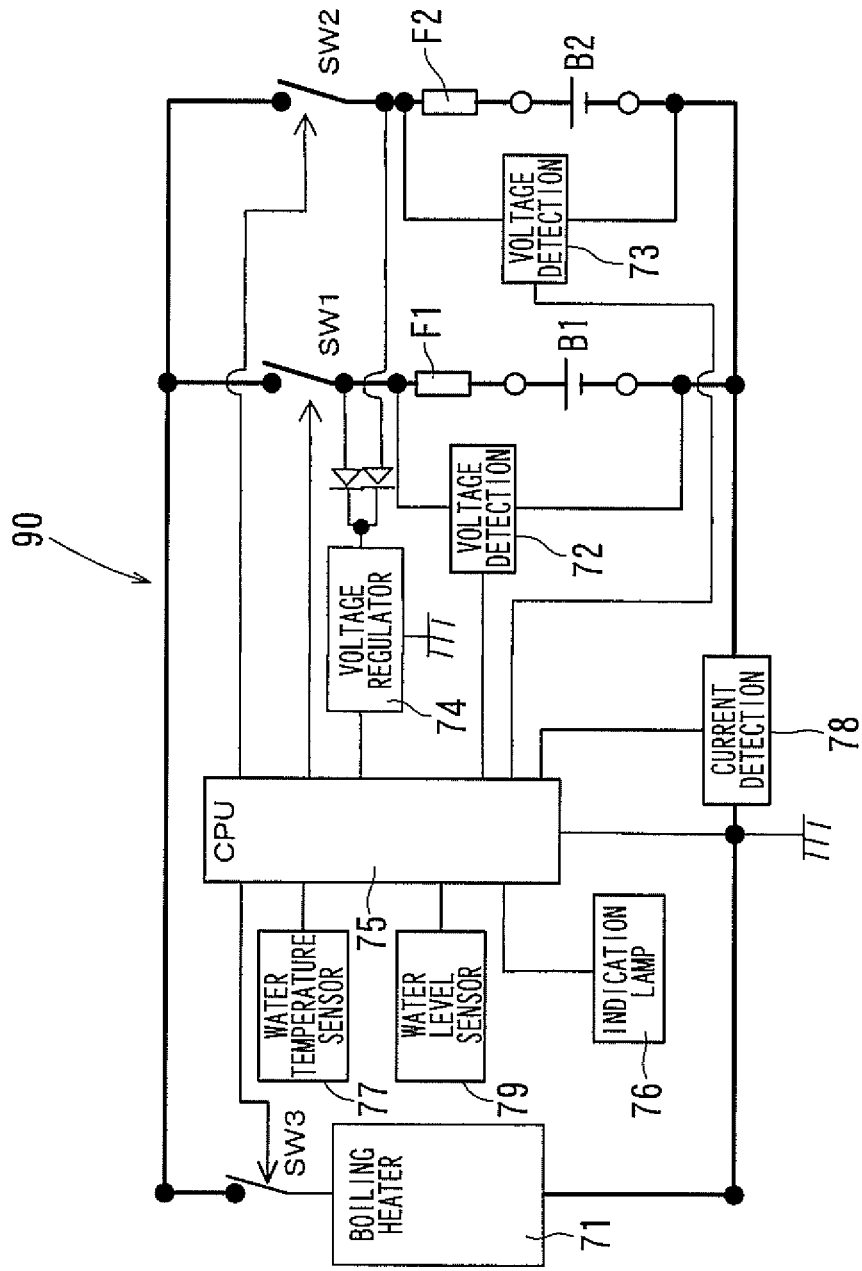
FIG. 20 is a block diagram showing a control circuit of the electric kettle according to one of the third to sixth embodiments.

Next, a heater control circuit 90 that can be applied to any one of the electric apparatuses 30, 40, 50, and 60 according to the third to sixth embodiments, will be described. FIG. 20 is a block diagram showing the heater control circuit 90. Regarding the heater control circuit 90, it will be described as applied to the electric apparatus 40 (electric kettle) according to the fourth embodiment. In the case of the above-described heater control circuit 70 for the coffee maker, both the boiling heater 71 and the heat retention heater 80 are provided. However, in the case of the heat control circuit 90 for the electric kettle, the heat retention heater 80 is not used, and only the boiling heater 71 is provided. Except the above construction, it has the same construction as that of the heater control circuit 70 shown in FIG. 19, and thus, the same elements are indicated by the same reference numerals and the explanation thereof will be omitted. Further, each step that is carried out to the step where water is boiled is the same as that of the case of the heater control circuit 70, and thus the explanations thereof will be omitted. A water temperature sensor 77 detects the temperature of the water stored in the apparatus main body part 41. The water temperature sensor 77 detects a boiled water temperature, and the detected water temperature is input to the CPU 75. After that, the CPU 75 further shortens the ON period in the ON/OFF control of the switch SW3, and reduces the power supply to the boiling heater 71 in order to be suitable for heat retention, which can substantially suppress power consumption and keep the heat in the boiled water. As a result, heat retention can be made automatically, and the boiled water can be maintained at an appropriate temperature for a long period of time without a user having to operate in particular, which can enhance an added value of the electric apparatus 30, 40, 50, and 60.

Further, in the above embodiments, by closing the battery storage part 15, 25, 33, 43, 53, 63 by use of the battery storage cover 16, 26, 34, 44, 54, 64, the battery storage part 15, 25, 33, 43, 53, 63 can be waterproof and dustproof, and the battery of the electric apparatus 10, 20, 30, 40, 50, 60 can be protected from rainfalls at various construction sites. Further, the apparatuses can be used even in dusty environment without anxiety.

Modifications can be made to the above-described embodiments. In the above embodiments, a coffee maker or an electric kettle are shown as examples that use batteries as the power source that can also be used in electric power tools. However, the present invention is also applicable to various other electric apparatuses such as an electric pot having heat retention function, an electric stove, an electric heater, an electric vest warmer, an electric hot-water bottle, an electric foot warmer, and an electric pocket warmer etc.

Further, by operating a heat exchanger by use of the power supplied from the battery B1, B2, it is possible to provide a battery type small refrigerator. In a battery type refrigerator that does not require an AC power source, batteries of a rechargeable-type electric power tool can be used as the power source at an outdoor construction site, and it is possible to provide a worker with cold beverages during rest breaks.

In the above-described embodiments, the 18 volts battery B1 and the 14.4 volts battery B2 can be used. However, it is also possible to use the batteries in a mutually interchanged state, i.e. to use a 14.4 volts battery B1 and an 18 volts battery B2. Further, it is also possible to use two 18 volts batteries B1 or two 14.4 volts batteries B2.

Further, it is also possible to use the electric apparatus in a state in which the 18 volts battery B1 (or the 14.4 volts battery B2) is attached to only one battery attaching part 25a (25b) and no battery is attached to the other battery attaching part 25b (25a).

Further, the voltage of the battery of the electric power tool to be used as the power source is not restricted to 14.4 volts or 18 volts, and other rated voltage batteries can be used, such as 7.2 volts, 10.8 volts, and 36 volts batteries. Further, the battery is not restricted to a lithium ion battery, and other types of battery such as a nickel-cadmium (Ni—Cd) battery etc. can be used.

Further, in the above-described embodiments, slide mounting type batteries are shown as an example, but insertion type batteries can be used in the present invention.

Further, in the above-described embodiments, an electric planer is shown as an example. However, it is also possible that other rechargeable battery type electric power tools such as an electric drill for perforating, an electric screw fastener for fastening screws, or a bench circular sawing machine etc. can be used, and batteries (battery packs) of these electric power tools can be used as the power source of the electric apparatuses. According to this, it is possible to use an electric apparatus such as a coffee maker or an electric kettle at an outdoor construction site where no AC power source is available, and to effectively use auxiliary batteries of electric power tools.

Further, it is also possible to adopt a dual-type system in which both an electric power tool's batteries and an ordinary AC power source can be used as the power source of electric apparatuses.

The invention claimed is:

1. An electric apparatus used for a water boiler that can boil water or a coffee maker that can extract coffee, wherein:
the electric apparatus includes a first battery-attaching part that is used for removably attaching a first battery and a second battery-attaching part that is used for removably attaching a second battery, the first battery having a different rated voltage from the second battery;
the electric apparatus is configured to use, as a main power source of the electric apparatus, the first battery or the second battery that respectively has a power capacity to fully power an electric power tool, wherein each battery is configured to have connectors that mechanically connect with corresponding connections of the electric power tool to fully power the electric power tool;
the first battery that is attached to the first battery-attaching part is configured to be electrically connected in parallel with the second battery that is attached to the second battery-attaching part; and
the first battery and the second battery are configured to be removably attached to the first battery-attaching part and the second battery-attaching part, respectively, by sliding the first and second batteries to the electric apparatus, wherein
each of the first and the second battery comprises a lock button by which each battery can be held in an attached state with respect to the corresponding battery-attaching part, and
each battery is detached from the corresponding battery-attaching part by sliding each battery after the lock button has been depressed.

2. The electric apparatus according to claim 1, wherein the electric apparatus includes a cover that is configured to cover at least one of the first battery-attaching part and the second battery-attaching part.

3. The electric apparatus according to claim 1, wherein the electric apparatus includes a handle at a top part thereof.

4. The electric apparatus according to claim 1, wherein the electric apparatus includes a water temperature sensor and a water level sensor.

5. The electric apparatus according to claim 4, wherein when there is no water to be detected by the water level sensor, the electric apparatus is configured to be automatically powered off.

6. The electric apparatus according to claim 1, wherein a power supply of the electric apparatus is suppressed and water temperature is maintained by the battery after the water is boiled.

7. The electric apparatus according to claim 1, wherein the electric apparatus includes a circuit that can detect current and voltage of the battery.

8. The electric apparatus according to claim 1, wherein the electric apparatus is configured to shut off a power supply of the electric apparatus and stop operation of the electric apparatus when an output of less than a predetermined value is detected in the electric apparatus such that both the electric apparatus and the battery are prevented from being damaged by arranging a voltage detection element between a positive and negative line of the electric apparatus.

9. The electric apparatus according to claim 1, wherein the electric apparatus is configured to shut off a power supply of the electric apparatus and stop operation of the electric apparatus when an output current of more than a predetermined value is detected in the electric apparatus such that both the electric apparatus and the battery are prevented from being damaged by arranging a current detection element in a negative line of the electric apparatus.

10. The electric apparatus according to claim 1, wherein:
the first battery and the second battery are configured to be removably attached to the first battery-attaching part and the second battery-attaching part, respectively, by sliding each of the first and second batteries in a direction perpendicular to a surface on which the electric apparatus is placed.

* * * * *